(12) United States Patent
Shigematsu

(10) Patent No.: US 11,655,861 B2
(45) Date of Patent: May 23, 2023

(54) FRICTION CLUTCH PRESSURE PLATE DEVICE

(71) Applicant: T.P.P. Co., Tobe-cho Iyo-gun Ehime-ken (JP)

(72) Inventor: Takeshi Shigematsu, Tobe-cho Iyo-gun Ehime-ken (JP)

(73) Assignee: T.P.P. Co., Tobe-cho Iyo-gun Ehime-ken (JP)

(*) Notice: Subject to any disclaimer, the term of this patent is extended or adjusted under 35 U.S.C. 154(b) by 22 days.

(21) Appl. No.: 17/622,821

(22) PCT Filed: Sep. 25, 2020

(86) PCT No.: PCT/JP2020/036262
§ 371 (c)(1),
(2) Date: Dec. 26, 2021

(87) PCT Pub. No.: WO2022/064635
PCT Pub. Date: Mar. 31, 2022

(65) Prior Publication Data
US 2022/0397161 A1  Dec. 15, 2022
US 2022/0397161 A1  Dec. 15, 2022

(51) Int. Cl.
*F16D 13/70* (2006.01)
*F16D 13/58* (2006.01)
(Continued)

(52) U.S. Cl.
CPC ............. *F16D 13/70* (2013.01); *F16D 13/54* (2013.01); *F16D 13/583* (2013.01); *F16D 43/12* (2013.01)

(58) Field of Classification Search
CPC ........ F16D 13/52; F16D 13/54; F16D 13/583; F16D 13/70; F16D 43/08; F16D 43/12
(Continued)

(56) References Cited

U.S. PATENT DOCUMENTS

| 1,855,643 A | 4/1932 | Matthews |
| 2,021,973 A | 11/1935 | Wemp |

(Continued)

FOREIGN PATENT DOCUMENTS

| EP | 1772642 A1 | 11/2007 |
| JP | S25-002890 Y | 4/1950 |

(Continued)

OTHER PUBLICATIONS

Decision to Grant Patent dated Oct. 4, 2022 in JP Pat App No. 2021-543367, which is the Japanese counterpart of the present application. Submitted additionally for Fm Pat Doc Cite Nos. 1-3.

(Continued)

*Primary Examiner* — Richard M Lorence
(74) *Attorney, Agent, or Firm* — JTT Patent Services, LLC; Gerald T. Peters

(57) ABSTRACT

Friction clutch pressure plate device 11 which is provided between spring device 12 and clutch disc unit 4 of friction clutch 1 comprises primary pressure plate 19, secondary pressure plate 22 which is capable of approaching and receding from primary pressure plate 19, and a plurality of weight plates 23 which are slidably arranged between mutually opposed side faces 19a, 22a of primary pressure plate 19 and secondary pressure plate 22. Primary pressure plate 19 comprises first outer circumferential wall 25 having inclined inner wall face 24, secondary pressure plate 22 comprises second outer circumferential wall 28 having perpendicular inner wall face 27, and weight plate 23 comprises tip portion engaging surface that engages with perpendicular inner wall face 27 and a tip portion inclined surface 32 that engages with inclined inner wall face 24.

20 Claims, 14 Drawing Sheets

(51) Int. Cl.
*F16D 13/54* (2006.01)
*F16D 43/12* (2006.01)

(58) Field of Classification Search
USPC .................................. 192/83, 105 B, 103 A
See application file for complete search history.

(56) References Cited

U.S. PATENT DOCUMENTS

| | | | |
|---|---|---|---|
| 2,045,557 | A | 6/1936 | Almen et al. |
| 2,195,354 | A | 3/1940 | Bateman |
| 5,575,367 | A | 11/1996 | Romanelli |
| 5,593,015 | A | 1/1997 | Kosumi et al. |
| 5,992,593 | A | 11/1999 | Yamamoto |
| 6,745,882 | B2 | 6/2004 | Ai |
| 7,082,661 | B2 | 8/2006 | Ijames et al. |
| 7,428,955 | B2 | 9/2008 | Shigematsu |
| 7,516,825 | B2 | 4/2009 | Shigematsu |
| D735,766 | S | 8/2015 | Shigematsu |
| 2002/0153221 | A1 | 10/2002 | Schnepf |
| 2004/0124061 | A1 | 7/2004 | Schuster |
| 2004/0163923 | A1 | 8/2004 | Ijames et al. |
| 2005/0279601 | A1 | 12/2005 | Tuday |
| 2006/0081440 | A1 | 4/2006 | Otto et al. |
| 2006/0231367 | A1 | 10/2006 | Shigematsu |
| 2007/0012537 | A1 | 1/2007 | Krause et al. |
| 2007/0012540 | A1 | 1/2007 | Yang |
| 2007/0151822 | A1 | 7/2007 | Toya et al. |
| 2008/0078639 | A1 | 4/2008 | Ogasawara et al. |
| 2008/0217131 | A1 | 9/2008 | Wittkopp et al. |
| 2008/0243134 | A1 | 10/2008 | Limberg et al. |
| 2008/0308377 | A1 | 12/2008 | Shigematsu |
| 2009/0114499 | A1 | 5/2009 | Maeng |
| 2009/0127055 | A1* | 5/2009 | Inomori .................. F16D 43/12 192/70.11 |
| 2011/0088993 | A1 | 4/2011 | Saito et al. |
| 2011/0220450 | A1 | 9/2011 | Chiang |
| 2012/0111693 | A1 | 5/2012 | Chern et al. |
| 2013/0025998 | A1 | 1/2013 | Brenner et al. |
| 2013/0087426 | A1 | 4/2013 | Gage |
| 2014/0080646 | A1 | 3/2014 | Goujon et al. |
| 2014/0116835 | A1 | 5/2014 | Heuver |
| 2015/0008087 | A1 | 1/2015 | Iijima |
| 2015/0247536 | A1 | 9/2015 | Sunada et al. |
| 2015/0369300 | A1 | 12/2015 | Biermann et al. |
| 2017/0030418 | A1 | 2/2017 | Hellgoth et al. |

FOREIGN PATENT DOCUMENTS

| | | |
|---|---|---|
| JP | S42-020935 B | 10/1967 |
| JP | S55-044166 A | 3/1980 |
| JP | S56-039327 A | 4/1981 |
| JP | S58-052341 U | 4/1983 |
| JP | S59-131033 A | 7/1984 |
| JP | S61-282640 A | 12/1986 |
| JP | S64-011433 U | 1/1989 |
| JP | H02-018458 B2 | 4/1990 |
| JP | H02-032894 Y2 | 9/1990 |
| JP | H04-030428 Y2 | 7/1992 |
| JP | H05-196060 A | 8/1993 |
| JP | H08-105463 A | 4/1996 |
| JP | 2005-009675 A | 1/2005 |
| JP | 2007-120765 A | 5/2007 |
| JP | 3976205 B1 | 9/2007 |
| JP | 2009-180350 A | 8/2009 |
| JP | 2015-187476 A | 10/2015 |
| WO | 2004 106760 A2 | 12/2004 |
| WO | 2005 116474 A1 | 8/2005 |

OTHER PUBLICATIONS

International Search Report (ISR) dated Dec. 1, 2020 in Intl App No. PCT/JP2020/036262, which was filed on Sep. 25, 2020, which published as WO 2022 064635 A1 on Mar. 31, 2022, and which is the International Application of which the present application is the national stage. Submitted additionally for Frn Pat Doc Cite Nos. 1-3.

International Search Report (ISR) dated Mar. 14, 2005 in Intl App No. PCT/JP2004/007658 filed on May 27, 2004 and published as WO 2004 106760 A1 on Dec. 9, 2004. See NPL Cite Nos. 6-7. See Fm Pat Doc Cite No. 19. Submitted additionally for US Pat Cite No. 4 and Frn Pat Doc Cite Nos. 4-8.

International Search Report (ISR) dated Feb. 24, 2006 in Intl App No. PCT/JP2005/009695 filed on May 26, 2005 and published as WO 2005 116474 A1 on Dec. 8, 2005. See Frn Pat Doc Cite No. 20. Submitted additionally for US Pat Cite No. 4 and Frn Pat Doc Cite Nos. 4-8.

Notice of Reasons for Refusal dated Sep. 28, 2006 in JP Pat App No. 2006-076888 filed Mar. 20, 2006 which issued as JP Pat No. 3976205 B1. Submitted in lieu of translation for Frn Pat Doc Cite Nos. 14-15.

Applicant brings to the attention of the Examiner the existence of possibly related US Pat No. 7428955 issued Sep. 30, 2008 on U.S. Appl. No. 10/558,301, which was filed on Nov. 28, 2005 and which published as US 2006 0231367 A1 on Oct. 19, 2006, which was the national stage of Intl App No. PCT/JP2004/007658 filed on May 27, 2004 and published as No. 2004 106760 A1 on Dec. 9, 2004, and which has overlapping inventorship/ownership as in the present case. See US Pat Cite No. 1 and US Pat App Pub Cite No. 1 on IDS of Dec. 8, 2022.

Applicant brings to attention of Examiner the existence of possibly related US Pat No. 7516825 issued Apr. 14, 2009 on U.S. Appl. No. 10/558,301, filed Nov. 28, 2005, published as US 2008 0308377 A1 on Dec. 18, 2008 and a DIV of U.S. Appl. No. 10/558,301, filed Nov. 28, 2005 and published as US 2006 0231367 A1 on Oct. 19, 2006, which was natl stage of Intl App No. PCT/JP2004/007658 filed May 27, 2004 and published as WO 2004 106760 A1 on Dec. 9, 2004, and which has overlapping nventorship/ownership as in present case. See US Pat Cite No. 2 & US Pat App Pub Cite No. 2 on IDS of Dec. 8, 2022.

Applicant brings to the attention of the Examiner the existence of possibly related US Patent No. D735766 issued Aug. 4, 2015 on U.S. Appl. No. 29/499,303, filed Aug. 13, 2014, which has overlapping inventorship/ownership as in the present case. See US Pat Cite No. 3 on IDS of Dec. 8, 2022.

* cited by examiner

FRICTION CLUTCH PRESSURE PLATE DEVICE

CROSS-REFERENCE TO RELATED APPLICATION AND INCORPORATION BY REFERENCE

This application is the national stage of International Application No. PCT/JP2020/036262, entitled "Friction Clutch Pressure Plate Device", filed 25 Sep. 2020, the content of which is incorporated herein in its entirety by reference.

TECHNICAL FIELD

The present invention relates to a friction clutch pressure plate device such as may be employed in a motorcycle or the like.

BACKGROUND ART

Friction clutches for interrupting the linkage between a driving shaft and a driven shaft are generally such that a pressure plate device comprising a plate which is a single annular member is provided between a clutch disc unit and a spring device that serves as the source of an elastic pressing force which is imparted to said clutch disc unit. This pressure plate device is such that during transmission of motive force from the driving shaft to the driven shaft, when the clutch disc unit is pressed on as a result of having been acted upon by the elastic pressing force from the spring device and transmission of motive force from the driving shaft to the driven shaft is blocked, action thereon from a linkage release unit of a force pushing backward thereon to at least partially overcome the elastic pressing force from the spring device causes the pressure that had been acting on the clutch disc unit to stop. The spring device is provided with a retainer at the side thereof opposite the pressure plate device. By causing the spring device to be straddled by and compressed between the retainer and the pressure plate device, such a retainer will permit production of an elastic pressing force that acts on the pressure plate device.

For example, at a friction clutch employed in a motorcycle, it is ordinarily the case that the engine output shaft serves as the driving shaft, and a sprocket which is linked to the clutch disc unit and which is for transmitting motive force to the rear wheel serves as the driven shaft, the linkage release unit being connected by a wire to the clutch lever, such that actuation for interrupting the linkage between the driving shaft and the driven shaft occurs when the operator of the motorcycle squeezes the clutch lever with his or her hand and causes that clutch lever to tilt. Whereas there have in recent years been many motorcycles which are provided with engines that produce high outputs, and the clutches with which those motorcycles are provided must be capable of transmitting the maximum torque from the engine, increase in the torque capable of being transmitted by a friction clutch will cause increase in the squeezing force necessary to tilt the clutch lever. In addition, in domains in which rotational speeds output by the engine are low, e.g., at times such as when the motorcycle is just starting to move or the like, it is necessary to engage in subtle actuation of the clutch lever so as to cause the torque that is transmitted from the driving shaft to the driven shaft to gradually increase as slippage is made to occur at the clutch disc unit. However, where a large squeezing force is required for tilted actuation of the clutch lever, persons with weak squeezing force will find it difficult to stably carry out subtle actuation of the clutch lever when the motorcycle is operated over a long period of time.

Among conventional friction clutches, there are therefore those in which, e.g., as disclosed at Patent Reference No. 1, a retainer having a ring-like portion which abuts a spring device comprising a diaphragm spring, and a plurality of V-shaped fingers that pass through said ring-like portion, is provided so as to reduce the amount of squeezing force which is necessary to cause tilting of the clutch lever when in domains in which the rotational speed output by the engine is low. At this friction clutch, the V-shaped fingers are pivotably mounted on the ring-like portion by means of pins, one side of the V-shaped fingers abuts the pressure plate device, and cylindrical weights are mounted to the other side of the V-shaped fingers. In addition, the retainer rotates together with the engine output shaft, that rotation of the retainer causes a centrifugal force to act on the weights, that centrifugal force operates at the V-shaped fingers as a torque about the pins, and that torque causes the one side of the V-shaped fingers to press on the pressure plate device with a pressing force in correspondence to the centrifugal force that acts on the weights. In addition, during transmission of motive force from the driving shaft to the driven shaft, not only the elastic pressing force from the spring device but also a pressing force which is produced by the centrifugal force that acts on the weights will act on the clutch disc unit by way of the pressure plate device. In other words, to reduce the amount of squeezing force necessary for actuation of the clutch lever, the elastic pressing force from the spring device is reduced, the pressing force from the centrifugal force that acts on the weights making up for the amount of that reduction, so as to permit the motive force to be properly transmitted from the driving shaft to the driven shaft.

PRIOR ART REFERENCES

Patent References

Patent Reference No. 1: Japanese Patent Application Publication Kokai No. 2005-009675

SUMMARY OF INVENTION

Problem to be Solved by Invention

However, because the aforementioned friction clutch provided with a retainer having a plurality of V-shaped fingers is such that the retainer occupies a large amount of space in the direction of the central axis of the clutch disc unit, the retainer portion protrudes outward by a large amount. In addition, a motorcycle or the like that is provided with such a friction clutch will have a large vehicle width.

And with regard to a friction clutch provided with a retainer not having V-shaped fingers, while the existing retainer which does not have such V-shaped fingers might be replaced with the aforementioned retainer which does have a plurality of V-shaped fingers so as to permit the clutch lever to be actuated by a small amount of squeezing force, because the retainer having that plurality of V-shaped fingers will occupy a large amount of space in the direction of the central axis, it is often the case that this will make attachment of the clutch cover impossible. And where this is the case, there will be no choice but to abandon the idea of replacing the retainer which does not have V-shaped fingers with the aforementioned retainer which has a plurality of V-shaped fingers.

It is also the case that the structure of a retainer which has a plurality of V-shaped fingers is complicated, making it expensive. What is more, as increase in the size of the weights would be difficult from the standpoints of the space occupied thereby as well as mechanical strength, it is not possible to increase the amount of the centrifugal force that acts on the weights. For this reason, because this causes the pressing force which acts on the clutch disc unit and which is produced by the centrifugal force that acts on the weights, which is required to make up for the reduction in the pressing force from the spring device, to be limited to a small amount, this makes it impossible to adequately reduce the amount of the pressing force from the spring device.

Furthermore, the one side of the V-shaped fingers and the pressure plate device are in sliding contact, and because the area over which contact is made is small, there is a tendency for the contact surfaces of both to wear. In addition, this is a factor which prevents increase in the endurance of the retainer.

Moreover, because the retainer rotates in linked fashion with the output shaft of the engine, the centrifugal force that acts on the weights increases in correspondence to the rotational speed of the engine, and the pressing force which is produced by the centrifugal force that acts on the weights becomes excessive at high engine rotational speeds. In addition, to interrupt the linkage between the driving shaft and the driven shaft, it will be necessary to cause the pressure plate device to be retracted from the clutch disc unit by at least partially overcoming the pressing force from the spring device and the excessive pressing force which is produced by the centrifugal force of the weights, it being necessary that the force pushing backward thereon for such purpose be made to act on the pressure plate device from the clutch lever. This being the case, the squeezing force necessary to actuate the clutch lever increases at high engine rotational speeds.

The present invention was conceived in light of such conventional problems. A primary object of the present invention is to provide an inexpensive friction clutch pressure plate device such as will make it possible, as compared with what is available conventionally, to greatly reduce the force required for actuation to cause interruption of a linkage between a driving shaft and a driven shaft across all domains from a low-speed domain of the driving shaft to a high-speed domain thereof, and which has a simple structure and is of high endurance, there being little tendency to experience failure, and which moreover occupies little space in the pressing direction.

Means for Solving Problem and Benefit of Invention

In accordance with a friction clutch pressure plate device associated with a first aspect of the present invention, a pressure plate device which is provided between a clutch disc unit of the friction clutch and a spring device that serves as a source of an elastic pressing force that is imparted to said clutch disc unit is constituted such that it comprises an annular primary pressure plate that is arranged toward the spring device; an annular secondary pressure plate that is provided, concentrically with respect to an axis of the primary pressure plate and in such fashion as to permit movement in a direction of said axis, and that is arranged toward the clutch disc unit; and a plurality of weight plates that are capable of sliding in radial directions with respect to the axis and that are provided at regularly spaced rotational angles about the axis between mutually opposed side faces of the primary pressure plate and the secondary pressure plate; wherein the primary pressure plate comprises a first outer circumferential wall that is formed toward the weight plates of such primary pressure plate and that possesses an inner wall face which is inclined such that distance thereof from the axis increases with decreasing distance therefrom to the secondary pressure plate; wherein the secondary pressure plate comprises a second outer circumferential wall that is formed toward the weight plates of such secondary pressure plate and that possesses a perpendicular inner wall face; and wherein the weight plates comprise tip portion engaging surfaces that are capable of abutting the perpendicular inner wall face of the second outer circumferential wall, and tip portion inclined surfaces that are capable of abutting the inclined inner wall face of the first outer circumferential wall.

The foregoing constitution makes it possible to increase the volume of the weight plates as a percentage of the volume of the space within which the weight plates are slidably contained, making it possible to achieve weight plates of large mass within a limited space, and making it possible to increase the centrifugal force that acts on the weight plates even when weight plate thickness is made small. Furthermore, causing tip portion engaging surfaces of weight plates to abut an perpendicular inner wall face of a second outer circumferential wall makes it possible to definitively impede movement of the weight plates. This being the case, it will be possible to limit the pressing force that is acts on the clutch disc unit and that is produced by the centrifugal force which acts on the weight plates so as to be not greater than a given value, and it will be possible to prevent the force necessary for actuation such as will at least partially overcome the pressing force from the spring device and cause such pressure plate device to be pushed backward for the purpose of interrupting transmission of motive force from the driving shaft to the driven shaft when at high rotational speeds from becoming excessive. Furthermore, it will be possible to cause the force necessary for actuation such as will at least partially overcome the pressing force from the spring device and cause such pressure plate device to be pushed backward when at low rotational speeds to be greatly reduced as compared with the conventional situation. In addition, it will make it possible to attain an inexpensive friction clutch pressure plate device that is of simple structure and high endurance, there being little tendency to experience failure, and that moreover occupies little space in the axial direction. And also, because it is possible in accordance with the foregoing constitution to cause the space which is occupied by the pressure plate device to be reduced such that it is on the same order as that of an existing device comprising a single member, it will be comparatively easy to replace the existing pressure plate device at the friction clutch in many different types of models of motorcycles and the like that are produced by a wide variety of manufacturers with a pressure plate device associated with the present invention, which will make it possible to easily achieve improvement in the actuatability of the clutch lever of the motorcycle or the like.

In accordance with a friction clutch pressure plate device associated with a second aspect of the present invention, a friction clutch pressure plate device which is provided between a clutch disc unit of the friction clutch and a spring device that serves as a source of an elastic pressing force that is imparted to said clutch disc unit may be constituted such that it comprises an annular primary pressure plate that is arranged toward the spring device; an annular secondary pressure plate that is provided, concentrically with respect to an axis of the primary pressure plate and in such fashion as to permit movement in a direction of said axis, and that is arranged toward the clutch disc unit; and a plurality of weight plates that are capable of sliding in radial directions with respect to the axis and that are provided at regularly spaced rotational angles about the axis between mutually opposed side faces of the primary pressure plate and the secondary pressure plate; wherein the primary pressure plate comprises a first outer circumferential wall that is formed toward the weight plates of such primary pressure plate and that possesses an inner wall face which is inclined such that distance thereof from the axis increases with decreasing distance therefrom to the secondary pressure plate; wherein the secondary pressure plate comprises a second outer circumferential wall that is formed toward the weight plates of such secondary pressure plate; wherein the weight plates comprise tip portion inclined surfaces that are capable of abutting the inclined inner wall face of the first outer circumferential wall; wherein the inner wall face possessed by the first outer circumferential wall is such that angles of inclination thereof with respect to a direction parallel to the axis mutually differ and comprise a plurality of wall face portions that are disposed in order of decreasing magnitude of the angles of inclination as one proceeds from the primary pressure plate toward the secondary pressure plate; wherein each of the tip portion inclined surfaces of the weight plates comprises a plurality of inclined surface portions that correspond to the plurality of wall face portions; wherein the plurality of inclined surface portions are such that angles of inclination thereof with respect to the direction parallel to the axis are respectively identical to the angles of inclination of the corresponding wall face portions; and widths of the plurality of inclined surface portions other than that inclined surface portion among the inclined surface portions which is nearest to the secondary pressure plate are less than widths of the corresponding wall face portions.

Because the foregoing constitution will make it possible to cause the pressing force that is produced at the primary pressure plate by centrifugal forces acting on the weight plates and that is applied to the clutch disc unit to be reduced as a percentage of those centrifugal forces in stepwise fashion in correspondence to increase in the rotational speed of the driving shaft, it will be possible to prevent the force necessary for actuation of the friction clutch from becoming excessive when at high rotational speeds.

In accordance with a friction clutch pressure plate device associated with a third aspect of the present invention, the constitution may be such that the angle of inclination of that wall face portion among the plurality of wall face portions making up the inner wall face possessed by the first outer circumferential wall which is farthest from the primary pressure plate is less than an angle of friction thereof.

In accordance with a friction clutch pressure plate device associated with a fourth aspect of the present invention, a pressure plate device which is provided between a clutch disc unit of the friction clutch and a spring device that serves as a source of an elastic pressing force that is imparted to said clutch disc unit may be constituted such that it comprises an annular primary pressure plate that is arranged toward the spring device; an annular secondary pressure plate that is provided, concentrically with respect to an axis of the primary pressure plate and in such fashion as to permit movement in a direction of said axis, and that is arranged toward the clutch disc unit; and a plurality of weight plates that are capable of sliding in radial directions with respect to the axis and that are provided at regularly spaced rotational angles about the axis between mutually opposed side faces of the primary pressure plate and the secondary pressure plate; wherein the primary pressure plate comprises a first outer circumferential wall that is formed toward the weight plates of such primary pressure plate and that possesses an inner wall face which is inclined such that distance thereof from the axis increases with decreasing distance therefrom to the secondary pressure plate; wherein the weight plates comprise tip portion inclined surfaces that are capable of abutting the inclined inner wall face of the first outer circumferential wall; the inner wall face possessed by the first outer circumferential wall is concavely curved; and the tip portion inclined surfaces of the weight plates are convexly curved such that curvatures thereof are greater than the curvature of the curve of the inner wall face possessed by the first outer circumferential wall.

Because the foregoing constitution will make it possible to cause the pressing force that is produced at the primary pressure plate by centrifugal forces acting on the weight plates and that is applied to the clutch disc unit to be reduced as a percentage of those centrifugal forces in continuous fashion in correspondence to increase in the rotational speed of the driving shaft, it will be possible to prevent the force necessary for actuation of the friction clutch from becoming excessive when at high rotational speeds.

In accordance with a friction clutch pressure plate device associated with a fifth aspect of the present invention, the constitution may be such that the primary pressure plate comprises a plurality of first partitions that are arranged at prescribed rotational angles about the axis; the secondary pressure plate comprises, between the second outer circumferential wall and the inner wall face, a plurality of second partitions that are arranged so as to oppose the plurality of first partitions; and the weight plates are such that shapes of such weight plates as viewed from fronts thereof are formed so as to be in shapes of fans having arcuate tips extending in parallel fashion with respect to the first outer circumferential wall and straight side edges extending in parallel fashion with respect to the first partitions as well as the second partitions, and the tip portion inclined surfaces are formed in shapes of conical surfaces.

Because the foregoing constitution will make it possible to increase the area of the inclined inner wall face at the first sidewall and the area of the tip portion inclined surfaces at the foregoing weight plates, this will make it possible to cause the portions of both that experience wear due to sliding to be distributed, and will make it possible to cause the wear of both to be kept comparatively low even when used over a long period of time.

In accordance with a friction clutch pressure plate device associated with a sixth aspect of the present invention, the constitution may be such that the primary pressure plate has a first space between the first partitions and the first outer circumferential wall; the secondary pressure plate has a second space between the second partitions and the second outer circumferential wall; and the weight plates have extensions which enter the first space and the second space.

The foregoing constitution will make it possible to increase the mass of the weight plates by an amount corresponding to the extensions that enter the foregoing first space and second space, and to further increase the centrifugal forces that act on the weight plates. Furthermore, because by providing the foregoing first space and the foregoing second space it will be possible to use a lathe or the like to form the perpendicular inner wall face of the chamber containing the primary pressure plate and the inclined inner wall face of the chamber containing the secondary pressure plate, this will facilitate machining of the perpendicular inner wall face and the inclined inner wall face.

In accordance with a friction clutch pressure plate device associated with a seventh aspect of the present invention, the constitution may be such that the weight plates have notches and/or holes for allowing passage therethrough of linkage rods for linking the clutch disc unit and a retainer that is arranged on a side opposite the clutch disc unit from the spring device.

The foregoing constitution will make it possible to also employ a friction clutch pressure plate device in accordance with the present invention to a friction clutch that is provided the foregoing linkage rods.

In accordance with a friction clutch pressure plate device associated with an eighth aspect of the present invention, the constitution may be such that instead of the primary pressure plate being arranged toward the spring device and the secondary pressure plate being arranged toward the clutch disc unit, the secondary pressure plate is arranged toward the spring device and the primary pressure plate is arranged toward the clutch disc unit.

In accordance with a friction clutch pressure plate device associated with a ninth aspect of the present invention, the constitution may be such that such pressure plate device is arranged toward an exterior in the axial direction of said clutch disc unit from the clutch disc unit; and the spring device comprises a diaphragm spring and is arranged toward the exterior in the axial direction of the clutch disc unit from such pressure plate device.

The foregoing constitution will make it possible when replacing an existing pressure plate device with a pressure plate device associated with the present invention to carry out such replacement procedures easily and in a short amount of time.

EMBODIMENTS FOR CARRYING OUT INVENTION

Figure 1:
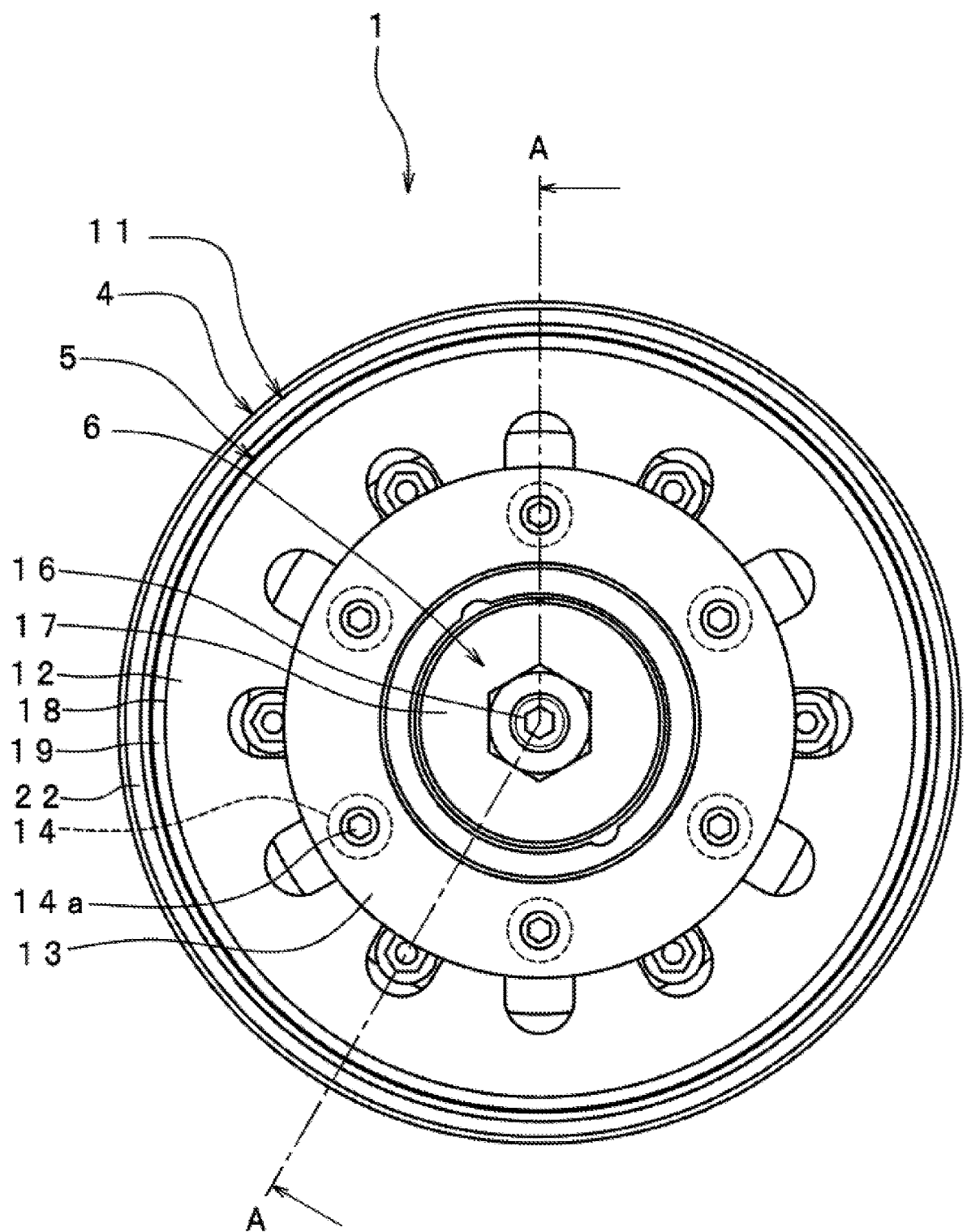
FIG. 1 Front view showing an example of a friction clutch employing a pressure plate device associated with an embodiment of the present invention.

Below, embodiments of the present invention are described with reference to the drawings. Note that as the following embodiments are examples of friction clutch pressure plate devices that are being presented for the purpose of providing specific implementations of the technical ideas of the present invention, the present invention should not be construed to limit these to the following. Furthermore, the present specification should not be construed as limiting the components recited in the claims to the components of the embodiments. In particular, except where otherwise specifically described as limiting, the scope of the present invention should not be understood as being limited only to the dimensions, materials, shapes, and so forth of the constituent parts, or to the relative arrangements thereamong, which are described at the embodiments, as these are merely examples which are provided only for illustrative purposes. Note that the sizes, positional relationships, and so forth of the components shown in the various drawings may in some cases be exaggerated for clarity of description. Moreover, in the description which follows, note that like or corresponding components are assigned like names and reference numerals and that detailed description thereof is omitted for convenience. Moreover, the respective elements that make up the present invention may be such that a plurality of elements are constituted from the same member in an embodiment in which a single member serves as a plurality of elements, or conversely a single member may be implemented in such fashion that the functions thereof are distributed among a plurality of members.

Figure 2:
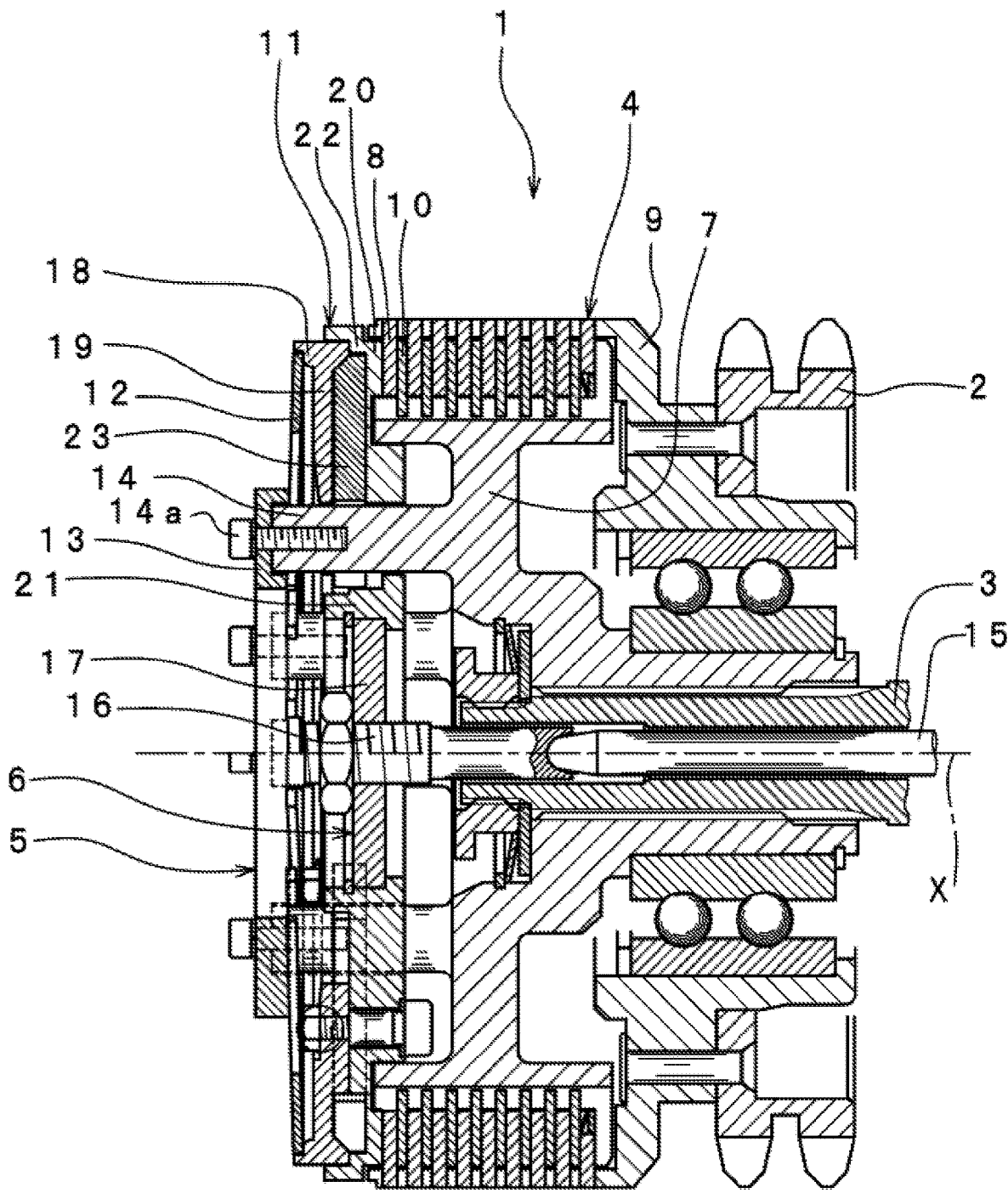
FIG. 2 Sectional view, being a section taken along A-A, of the friction clutch shown in FIG. 1, as seen from the direction indicated by the arrows.

Friction clutch 1 shown in FIG. 1 and FIG. 2 which is provided with pressure plate device 11 associated with an embodiment of the present invention may be installed in a motorcycle, for example. To interrupt the linkage between engine output sprocket 2 serving as driving shaft, and transmission input shaft 3 serving as driven shaft, this friction clutch 1 is provided with clutch disc unit 4, pressing unit 5 which imparts a pressing force to clutch disc unit 4, and linkage release unit 6 for interrupting the pressing force which is applied to clutch disc unit 4 from pressing unit 5. This friction clutch 1 might for example be employed in a motorcycle, in which case upon causing there to be linkage between engine output sprocket 2 and transmission input shaft 3, the motive force from output sprocket 2 might be transmitted to the rear wheel, not shown, by way of transmission input shaft 3.

Clutch disc unit 4 is provided with driving hub 9 which rotates together with output sprocket 2, driving friction plate(s) 10 which are mounted to driving hub 9 and which are capable of sliding in the direction of axis X, and driven friction plate(s) 8 which are mounted to driven hub 7 which rotates together with transmission input shaft 3, frictional forces generated between driving friction plate(s) 10 and driven friction plate(s) 8 due to the pressing force imparted thereon from pressing unit 5 causing there to be linkage between driving friction plate(s) 10 and driven friction plate(s) 8, as a result of which linkage between transmission input shaft 3 and engine output sprocket 2 is made possible.

Pressing unit 5 is made up of pressure plate device 11 and spring device 12 and retainer 13, which are disposed in linear arrangement in this order as one proceeds toward the exterior (i.e., from a point in the central region in the drawing toward the left side in the drawing of FIG. 2) along axis X of clutch disc unit 4. In other words, pressure plate device 11 is arranged between clutch disc unit 4 and spring device 12, and retainer 13 is arranged toward the exterior from spring device 12. Retainer 13 is secured by bolt 14a to the tip of linkage rod 14 which is fastened to driven hub 7, pressure plate device 11 and spring device 12 being penetrated by linkage rod 14. Accordingly, pressing unit 5 is made capable of rotating together with transmission input shaft 3. And by causing spring device 12 to deform in the direction in which it is compressed as spring device 12 is straddled between retainer 13 and pressure plate device 11, pressing unit 5 is able to cause spring device 12 to produce an elastic pressing force that acts on pressure plate device 11.

Linkage release unit 6 is provided with pushrod 15 for at least partially overcoming the elastic pressing force from spring device 12 and causing pressure plate device 11 to be pushed backward toward the exterior in the direction of axis X, adjustment screw 16 for setting the pressing force due to spring device 12 when the engine is stopped, and engaging body 17 which is in threaded engagement with this adjustment screw 16. Pushrod 15 is connected to a clutch lever, not shown, actuation of this clutch lever permitting movement of pushrod 15 toward the exterior in the direction of axis X.

Pressure plate device 11 is such that during transmission of motive force from engine output sprocket 2 to transmission input shaft 3, when clutch disc unit 4 is pressed on as a result of having been acted upon by the pressing force from spring device 12 and the motive force from output sprocket 2 to transmission input shaft 3 is blocked, action thereon from linkage release unit 6 of a force pushing backward thereon to at least partially overcome the pressing force applied thereto from spring device 12 makes it possible for the pressure that had been acting on clutch disc unit 4 to be released.

Pressure plate device 11 associated with a working example of the present invention is provided with annular primary pressure plate 19 having first engaging part 18 which engages with spring device 12, and secondary pressure plate 22 that is arranged toward clutch disc unit 4 and that has second engaging part 20 which engages with clutch disc unit 4 and that has third engaging part 21 which engages with linkage release unit 6.

At friction clutch 1 shown in FIG. 2, spring device 12 comprises a single diaphragm spring, retainer 13 engaging with a region in the vicinity of the inside circumferential portion of diaphragm spring 12 and retaining the region in the vicinity of the inside circumferential portion of diaphragm spring 12 so as to prevent it from being retracted therefrom in a direction toward the exterior. First engaging part 18 is capable of engaging with an outside circumferential end portion of diaphragm spring 12, i.e., with a portion at the tip toward the interior in the direction of axis X of spring device 12. Second engaging part 20 may abut primary friction plate 8. Third engaging part 21, which is provided at an inside circumferential portion of secondary pressure plate 22, retains engaging body 17 so as to prevent it from moving in the direction of axis X with respect to secondary pressure plate 22.

Figure 3:
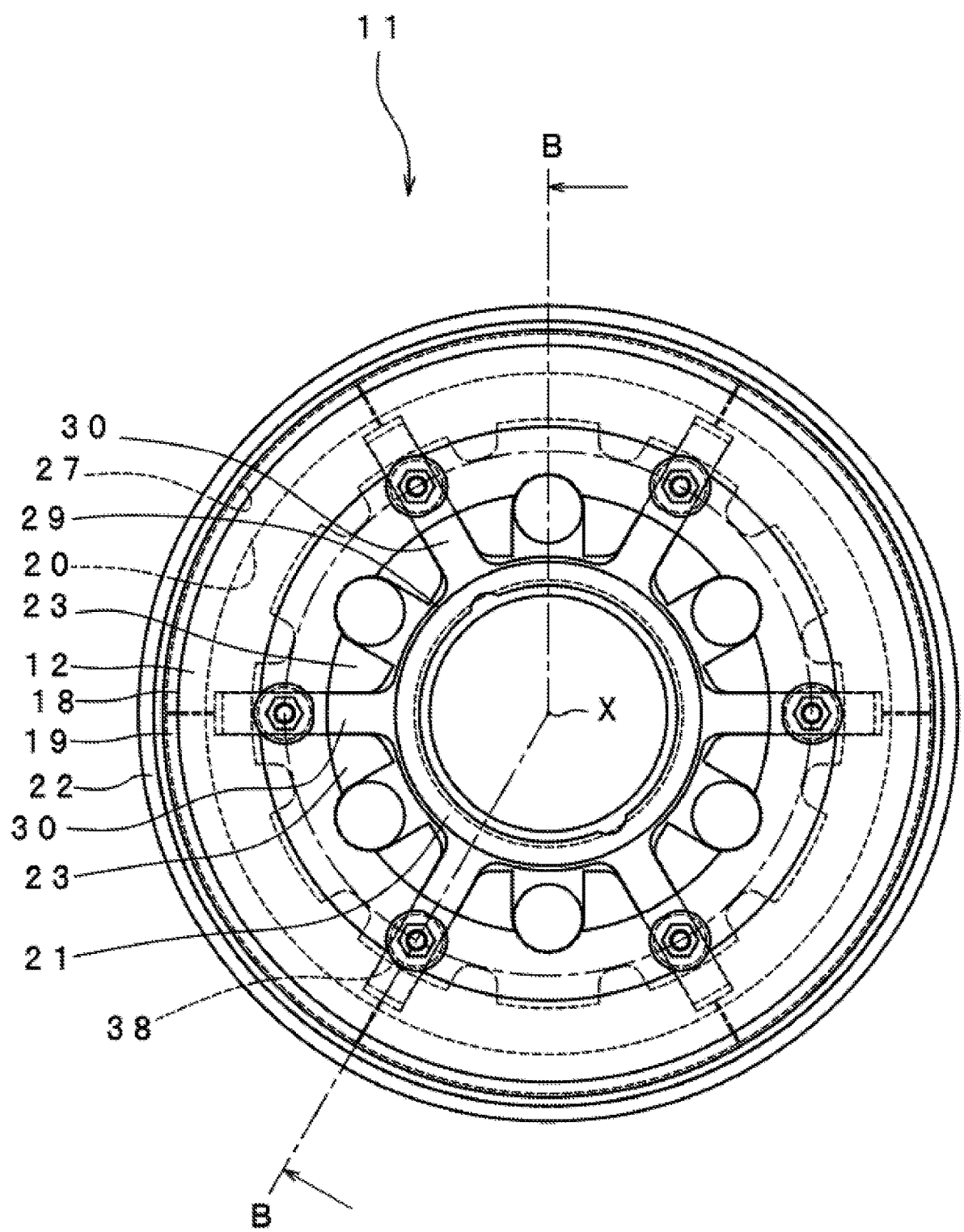
FIG. 3 Front view of a pressure plate device associated with an embodiment of the present invention.

As shown in FIG. 3, primary pressure plate 19 and secondary pressure plate 22 are respectively comprised of annularly shaped members. At FIG. 4, the left side of pressure plate device 11 is the spring device side thereof, and the side opposite thereto is the clutch disc unit side thereof. Primary pressure plate 19 is arranged at the spring device side thereof, and secondary pressure plate 22 is arranged, concentrically with respect to axis X of primary pressure plate 19 and in such fashion as to permit movement in the direction of axis X, at the side thereof which is opposite first engaging part 18 of primary pressure plate 19, i.e., at the clutch disc unit 4 side thereof. A plurality of weight plates 23 that extend in parallel fashion with respect to mutually opposed side faces 19a, 22a and that are arranged so as to be capable of sliding in radial directions with respect to axis X are provided at regularly spaced rotational angles about axis X between mutually opposed side faces 19a, 22a of primary pressure plate 19 and secondary pressure plate 22.

Primary pressure plate 19 is provided with first outer circumferential wall 25 which possesses inclined inner wall face 24, and with a plurality of first partitions 26 which are arranged at prescribed rotational angles about axis X, that are formed toward the respective weight plates 23 of such primary pressure plate 19. Inner wall face 24 is inclined such that the distance thereof from axis X increases with decreasing distance therefrom to secondary pressure plate 22.

Secondary pressure plate 22 is provided with second outer circumferential wall 28 which possesses perpendicular inner wall face 27, with inner circumferential wall 29 which is arranged toward the interior from second outer circumferential wall 28, and with a plurality of second partitions 30 which are arranged so as to oppose the plurality of first partitions 26 between second outer circumferential wall 28 and inner circumferential wall 29, that are formed toward the respective weight plates 23 of such secondary pressure plate 22.

Weight plate 23 is surrounded by mutually adjacent first partitions 26 among the plurality of first partitions 26 as well as second partitions 30 that are mutually adjacent and that are opposed to the mutually adjacent first partitions 26 and by first outer circumferential wall 25 as well as second outer circumferential wall 28 and by inner circumferential wall 29, and is provided with tip portion engaging surface 31 which is capable of abutting perpendicular inner wall face 27 of second outer circumferential wall 28 and with tip portion inclined surface 32 which is capable of abutting inclined inner wall face 24 of the first outer circumferential wall 25 and which conforms to said inclined inner wall face 24.

Figure 5:
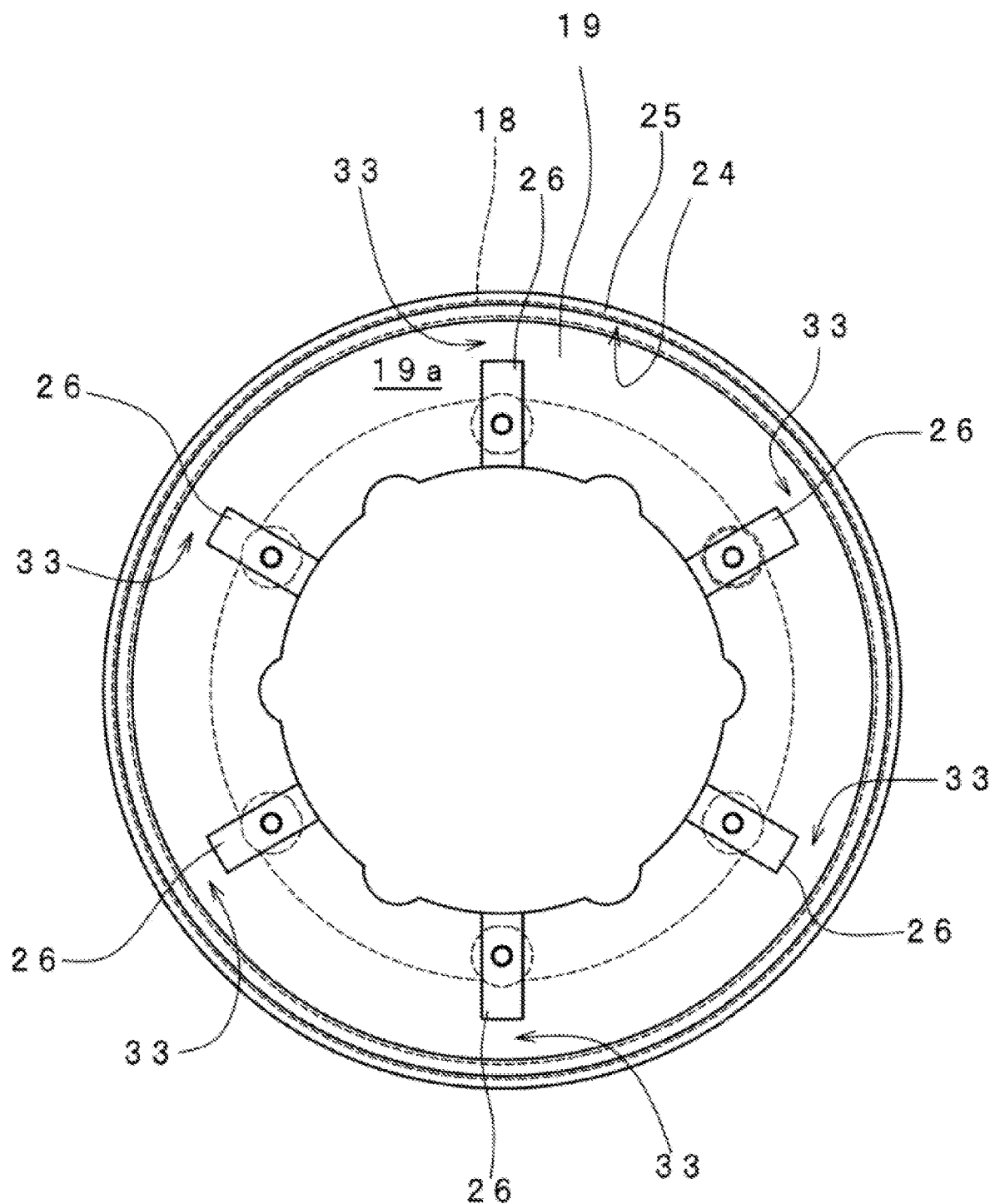
FIG. 5 Rear view of primary pressure plate.
Figure 6:
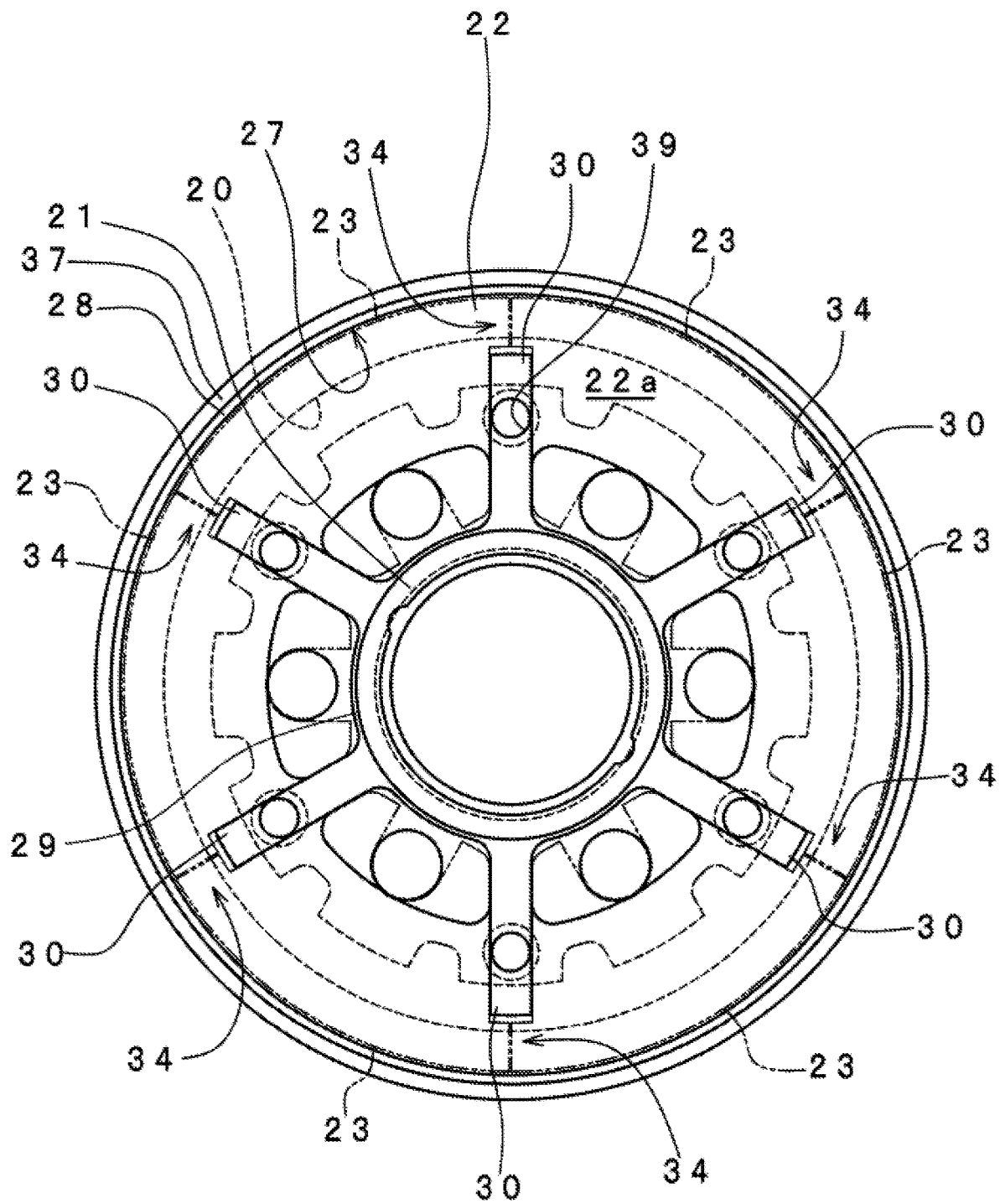
FIG. 6 Front view of secondary pressure plate.
Figure 7:
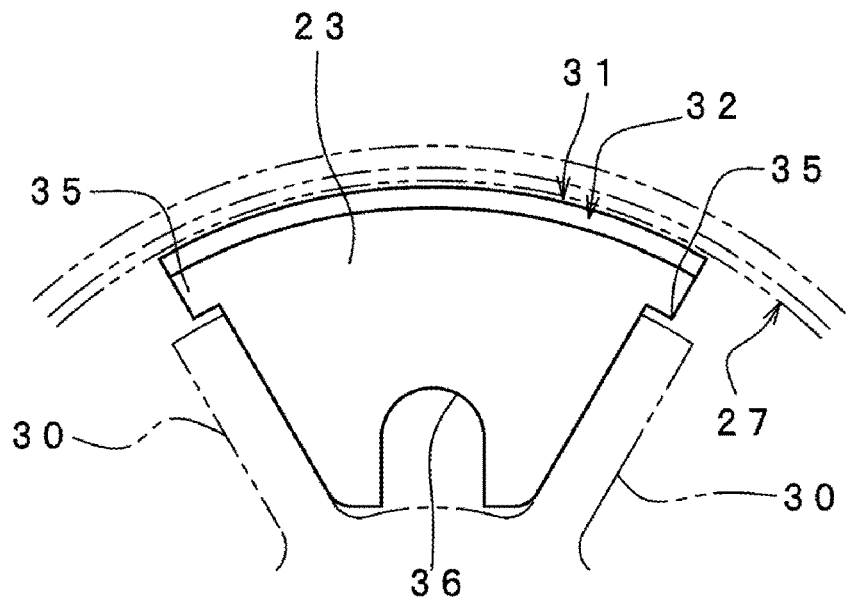
FIG. 7 Front view of weight plate.

Primary pressure plate 19 has first space 33 between first partitions 26 and first outer circumferential wall 25 as shown in FIG. 5, secondary pressure plate 22 has second space 34 between second partitions 30 and second outer circumferential wall 28 as shown in FIG. 6, and weight plate 23 has extensions 35 which enter first space 33 and second space 34 as shown in FIG. 7. Furthermore, weight plate 23 is such that the shape of the outline of such weight plate 23 as viewed from the front thereof is formed so as to be in the shape of a fan having an arcuate tip extending in parallel fashion with respect to first outer circumferential wall 25 and straight side edges extending in parallel fashion with respect to first partition 26 as well as second partition 30, tip portion inclined surface 32 being formed in the shape of a conical surface. Tip portion engaging surface 31 is formed in the shape of a cylindrical surface which conforms to perpendicular inner wall face 27 of second outer circumferential wall 28. Note that tip portion engaging surface 31 and perpendicular inner wall face 27 need not be cylindrical surfaces so long as they are capable of impeding movement of weight plate 23. Furthermore, weight plate 23 has notch 36 for allowing linkage rod 14 shown in FIG. 2 to pass therethrough. Because the distance that weight plate 23 slides is small, a hole can be employed in place of this notch 36.

Secondary pressure plate 22 is provided with third outer circumferential wall 37 which is formed toward the exterior from second outer circumferential wall 28. Third outer circumferential wall 37 is capable of guiding the outer wall face of first outer circumferential wall 25 of primary pressure plate 19 in the direction of axis X at the inner wall face thereof.

Figure 4:
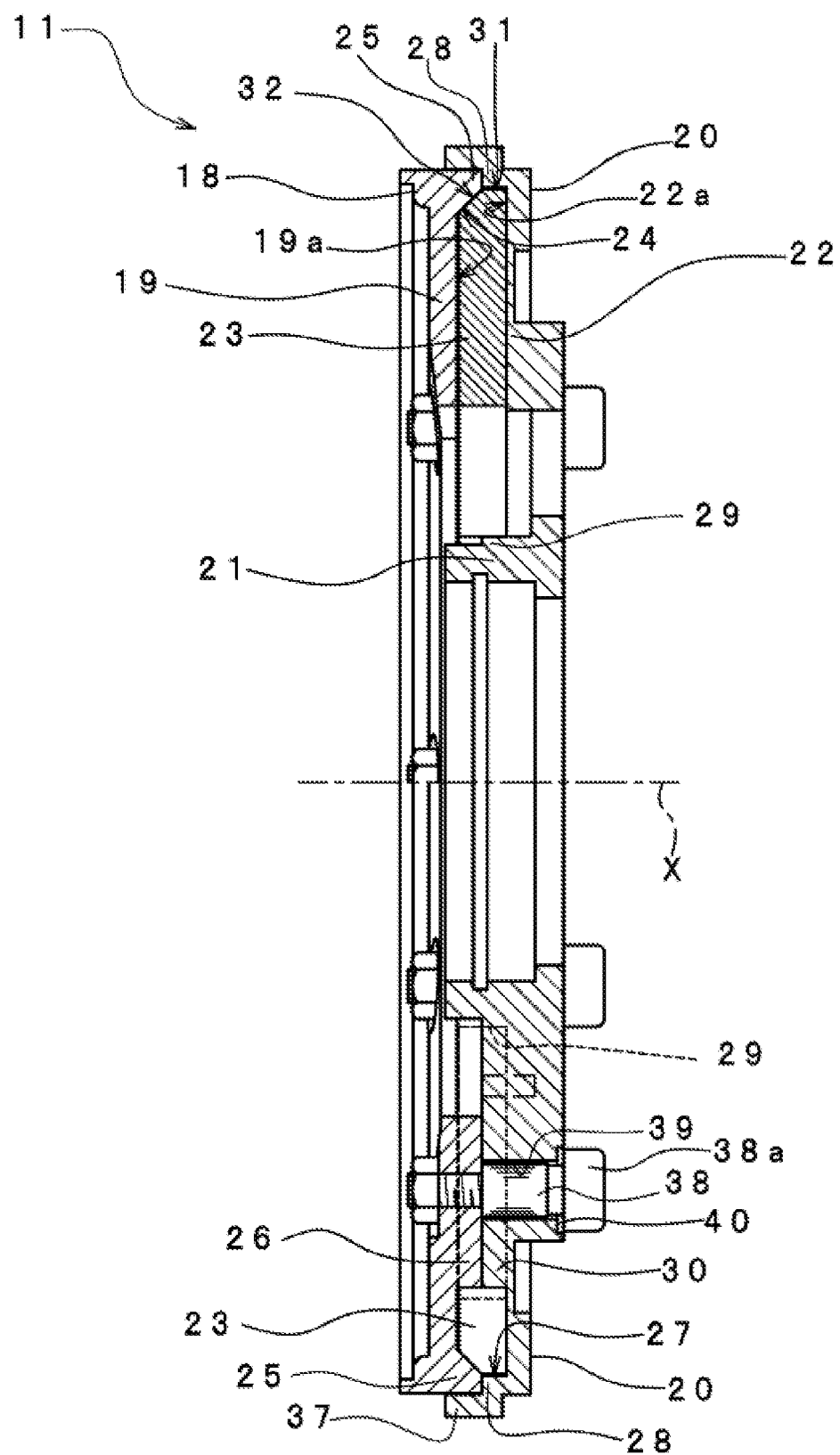
FIG. 4 Sectional view, being a section taken along B-B, of the pressure plate device shown in FIG. 3, as seen from the direction indicated by the arrows.

To assemble pressure plate device 11, weight plate 23 is arranged on side face 22*a* of secondary pressure plate 22 as indicated by the double-dash chain line in FIG. 6, following which first partition 26 is made to oppose second partition 30, and first outer circumferential wall 25 of primary pressure plate 19 is mated to the inside circumferential side of third outer circumferential wall 37 of secondary pressure plate 22. Moreover, in the case of the present embodiment, to prevent primary pressure plate 19 from coming free from secondary pressure plate 22, the tip of headed guide pin 38 is made to pass through hole 39 formed in secondary pressure plate 22, and the tip of that headed guide pin 38 is fastened to primary pressure plate 19, as shown in FIG. 4 When in this state, primary pressure plate 19 and secondary pressure plate 22 are made capable of being made to mutually approach and recede by an amount corresponding to the gap between head 38*a* of guide pin 38 and counterbored surface 40.

Figure 8:
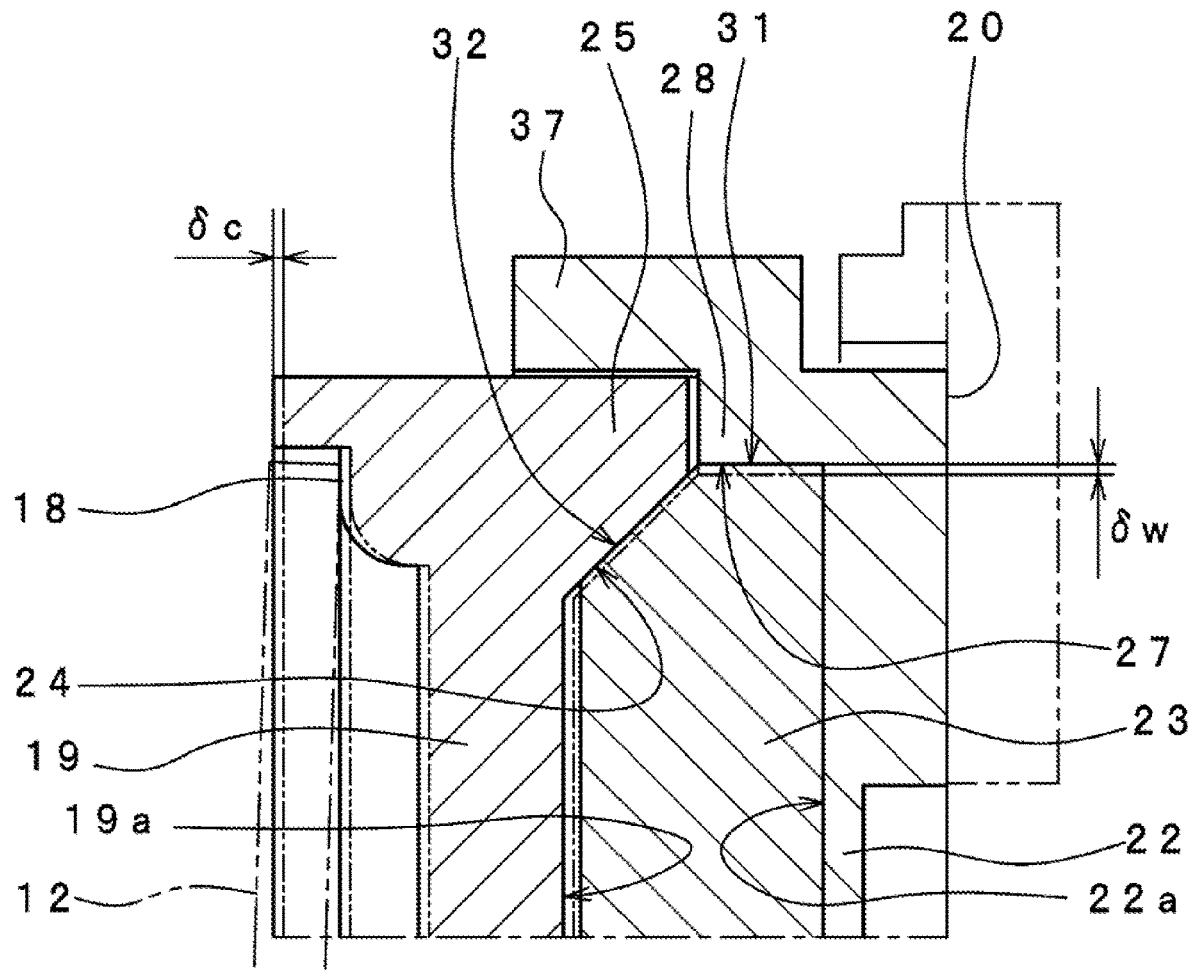
FIG. 8 Enlarged sectional view showing a region in the vicinity of the outside circumference of a pressure plate device.
Figure 9:
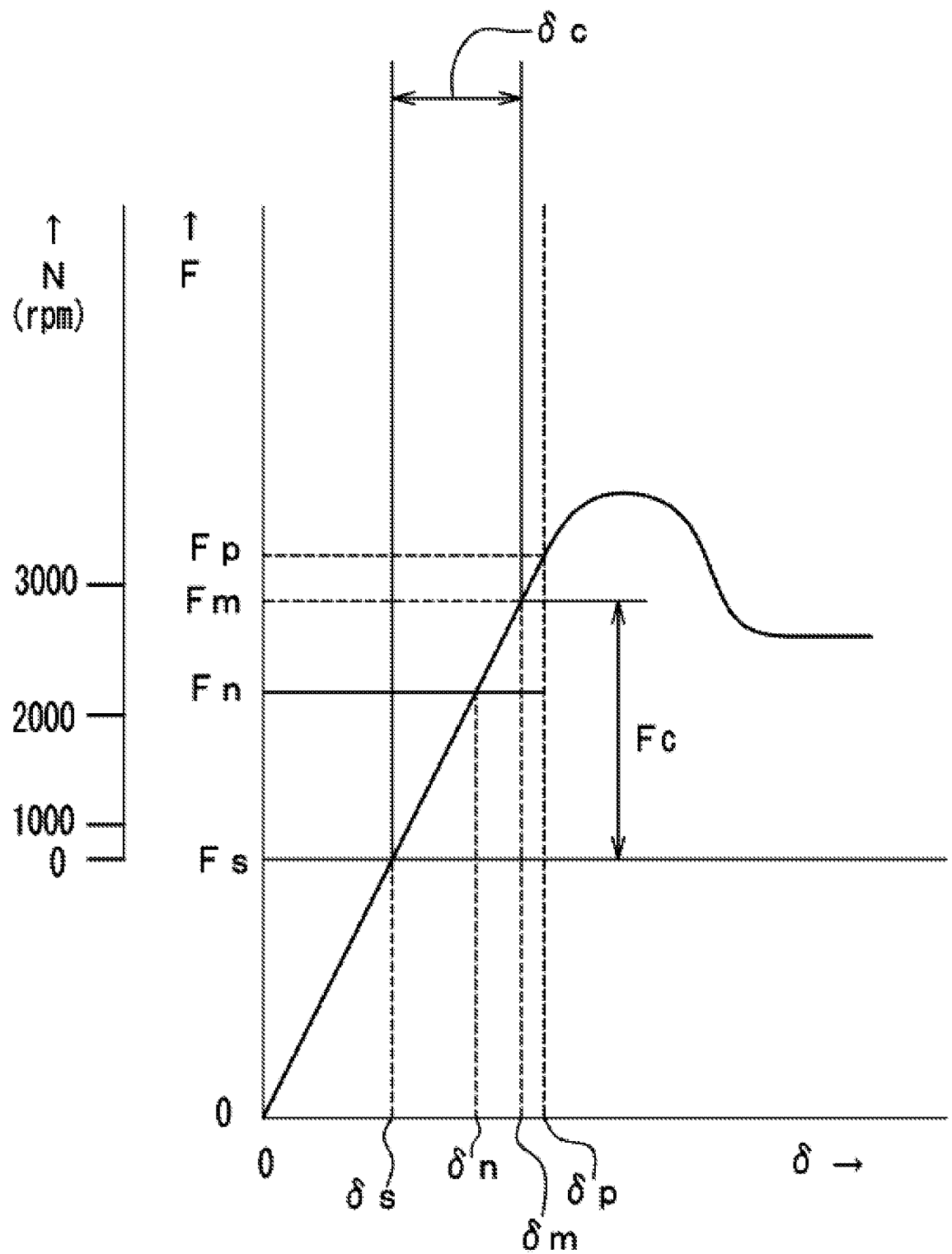
FIG. 9 Line drawing showing in schematic fashion the relationship between the deflection at a spring device and the pressing force as well as the rotational speed that are produced as a result of the deflection at the spring device.

Operation of pressure plate device 11 will next be described. FIG. 8 is an enlarged sectional view showing a region in the vicinity of the outside circumference of pressure plate device 11, and FIG. 9 is a line drawing showing the relationship between the deflection $\delta$ at spring device 12 in pressure plate device 11 and the pressing force F from second engaging part 20 that acts on clutch disc unit 4 as well as the rotational speed N of output shaft 2. At the line drawing of FIG. 9, the curve shown in solid line indicates an example of a characteristic curve of an existing spring device 12 at a friction clutch 1, Fn being the pressing force on clutch disc unit 4 which is necessary to prevent occurrence of slippage at clutch disc unit 4, $\delta n$ being the deflection of spring device 12 at such time, Fs being the pressing force on clutch disc unit 4 produced by spring device 12 when the rotational speed of output shaft 2 is zero, $\delta s$ being the deflection of spring device 12 at such time, Fc being the pressing force on clutch disc unit 4 due to the centrifugal force acting on weight plate 23, $\delta c$ being the deflection of spring device 12 produced by Fc, Fm being the pressing force on clutch disc unit 4 produced at a time when tip portion engaging surface 31 of weight plate 23 abuts perpendicular inner wall face 27 of second outer circumferential wall 28, $\delta m$ being the deflection of spring device 12 at such time, Fp being the pressing force on clutch disc unit 4 produced at the limit of proportionality of spring device 12, and 4 being the deflection of spring device 12 at such time. Here, Fn will be referred to as the required load, Fs will be referred to as the load under initial conditions, Fc will be referred to as the centrifugal load, Fm will be referred to as the maximum load, Fp will be referred to as the critical load, $\delta n$ will be referred to as the deflection when under the required load, $\delta s$ will be referred to as the initial deflection, $\delta m$ will be referred to as the maximum deflection, and $\delta p$ will be referred to as the critical deflection.

At FIG. 2, when engine output sprocket 2 is not rotating and pressure plate device 11 is not pushed backward by linkage release unit 6, primary pressure plate 19 of pressure plate device 11 will be acted on by a pressing force, i.e., load Fs under initial conditions, from spring device 12 and will be pressed against secondary pressure plate 22 as indicated by the double-dash chain line in FIG. 8, and the end face of first outer circumferential wall 25 and the end face of second outer circumferential wall 28 will abut. Furthermore, at such time, weight plate 23 will be retracted from second outer circumferential wall 28 of secondary pressure plate 22 as indicated by the double-dash chain line, and tip portion inclined surface 32 of weight plate 23 will be in contact with or will have receded from inclined inner circumferential wall 29 of primary pressure plate 19. Furthermore, at FIG. 9, the pressing force F that acts on clutch disc unit 4 at this time will be Fs.

When engine output sprocket 2 shown in FIG. 2 rotates (the engine is started), the centrifugal force at weight plate 23 acts, which causes weight plate 23 to move in radial directions with respect to axis X, which to say upward at FIG. 8, and also causes the tip portion inclined surface 32 thereof to engage with inclined inner wall face 24 of first outer circumferential wall 25 of primary pressure plate 19, pushing that inclined inner wall face 24 upward. This being the case, tip portion inclined surface 32 and inclined inner wall face 24 operate to cause the upward pressing force of weight plate 23 to be converted to a force pressing toward the axis X exterior direction, and primary pressure plate 19 is pushed toward the axis X exterior direction. In other words, centrifugal forces in radial directions with respect to axis X at weight plate 23 cause production of pressing forces in the axis X exterior direction which at primary pressure plate 19 will take the form of forces that include a force that presses toward the left in FIG. 8. The pressing force that remains after subtracting mechanical losses from the pressing force in the axis X exterior direction produced by the centrifugal force acting on this weight plate 23, i.e., centrifugal load Fc, acts on clutch disc unit 4 from secondary pressure plate 22 by way of second engaging part 20, and the reactive force which is produced by that pressing force takes the form of a force which acts on spring device 12 from primary pressure plate 19 in a direction tending to cause compression thereof. In addition, in correspondence to increase in rotational speed of output shaft 2, the centrifugal force acting on weight plate 23 increases, as a result of which, when the tip of weight plate 23 reaches second outer circumferential wall 28, tip portion engaging surface 31 of weight plate 23 abuts perpendicular inner wall face 27 of second outer circumferential wall 28, and movement of weight plate 23 is obstructed by second outer circumferential wall 28.

While weight plate 23 is moving from the location shown in double-dash chain line to the location shown in solid line in FIG. 8, primary pressure plate 19 moves to the operating location shown in solid line in FIG. 8. In accordance with this embodiment, because the angle of inclination with respect to the vertical direction of tip portion inclined surface 32 of weight plate 23 is 45°, and because the angle of inclined inner wall face 24 is similar, the distance $\delta w$ moved from where tip portion inclined surface 32 of weight plate 23 first makes contact with inclined inner wall face 24 to where tip portion engaging surface 31 of weight plate 23 abuts perpendicular inner wall face 27, and the distance $\delta c$ moved by primary pressure plate 19 during this interval, are equal. To achieve stable operation of weight plate 23 and primary pressure plate 19, it is preferred that the distance δw moved by weight plate 23 and the distance δc moved by primary pressure plate 19 be made small, the distance δw moved by weight plate 23 and the distance δc moved by primary pressure plate 19 being respectively 0.5 millimeter in the present embodiment.

When primary pressure plate 19 is at the location shown in double-dash chain line at FIG. 8, the deflection of spring device 12 at FIG. 9 is δs; when primary pressure plate 19 is at the location shown in solid line at FIG. 8, i.e., when the distance moved by primary pressure plate 19 is δc, the deflection produced at spring device 12 at FIG. 9 is the maximum deflection δm. The difference between the initial deflection δs and the deflection δm of spring device 12 when the distance moved by primary pressure plate 19 is δc corresponds to the increase in deflection at spring device 12 which is produced by centrifugal load Fc, i.e., centrifugal deflection δc, this centrifugal deflection δc being equal to the distance δc moved by primary pressure plate 19 shown in FIG. 8.

To make a pressure plate device 11 associated with the present embodiment interchangeable with a conventional pressure plate device provided at an existing friction clutch, because it will be necessary to make the space occupied by pressure plate device 11 be the same or nearly the same as that of the existing device, the thickness of weight plate 23, the distance δc moved by primary pressure plate 19, the thicknesses and outside diameters of primary pressure plate 19 and secondary pressure plate 22, and so forth might, for example, first be established. Next, maximum load Fm might be established such that it is greater than required load Fn but less than critical load Fp, and the rotational speed N of the engine output shaft at maximum load Fm might be established. In addition, load Fs under initial conditions might, for example, be established such that it is half of maximum load Fm; the necessary centrifugal load Fc might be calculated by subtracting that load Fs under initial conditions from the maximum load Fm; a determination might be made as to whether or not the necessary centrifugal load Fc would be attainable based on that centrifugal load Fc, the spring constant of the spring device at the existing friction clutch, and the centrifugal deflection δc of the primary pressure plate; and in the event that it is determined that the necessary centrifugal load Fc would be attainable, the necessary mass of weight plate 23 might be calculated based on the necessary centrifugal load Fc, the rotational speed N, and the distance from axis X to the center of mass of weight plate 23. In the event that it is determined that the necessary centrifugal load Fc would not be attainable, the spring device might be replaced with one that has the necessary spring constant, and the spring constant of that spring device with which it was replaced might be used to calculate the necessary mass of weight plate 23 in similar fashion as above. In addition, the frontal area of weight plate 23 might be calculated from this necessary mass of weight plate 23 and from the thickness of the weight plate and the specific gravity of the weight plate, and the shape of the front of weight plate 23 might be determined based on this calculated frontal area of weight plate 23. Because weight plate 23 is in the shape of a plate, the mass thereof may be adjusted in comparatively easy fashion by using a drill press or the like, for example, to form hole(s) and/or notch(es) in the thickness direction of that weight plate 23.

At FIG. 9, because the maximum deflection δm that is produced by spring device 12 is less than the critical deflection 4 of the spring device 12 but is greater than the deflection δn of the spring device 12 when it produces required load Fn, when a pressure plate device 11 associated with the present embodiment is used to replace an existing device it will be possible to use the existing spring device 12 as is. Because it is normally the case that the deflection 4 of spring device 12 at criticality will be sufficiently greater than the deflection δn when under required load which exists at the time that the pressing force F is the required load Fn, it is often the case that there will be no need to replace either the spring device 12 or the weight plate 23. Furthermore, where as with friction clutch 1 shown in FIG. 2 the pressure plate device 11 is arranged in the exterior direction axially from clutch disc unit 4, because it will normally be the case that removal of the clutch cover will cause pressing unit 5 to be exposed, this is an advantageous in terms of the ease with which an existing device can be replaced by pressure plate device 11. Furthermore, where spring device 12 comprises a single diaphragm spring, the replacement procedure will be comparatively easy. Furthermore, because it is possible to increase the spring constant of the diaphragm spring by causing the location at which diaphragm spring 12 and retainer 13 engage to be altered such that it is made to be farther from the hole of diaphragm spring 12, instead of replacing the existing diaphragm spring 12 with one that has a larger spring constant, a retainer 13 might be prepared in which the portion that engages with diaphragm spring 12 is arranged so as to permit engagement with diaphragm spring 12 to occur at a location permitting attainment of the necessary spring constant, and the prepared retainer 13 might be used to replace the existing one.

Working Example 1

Figure 10:
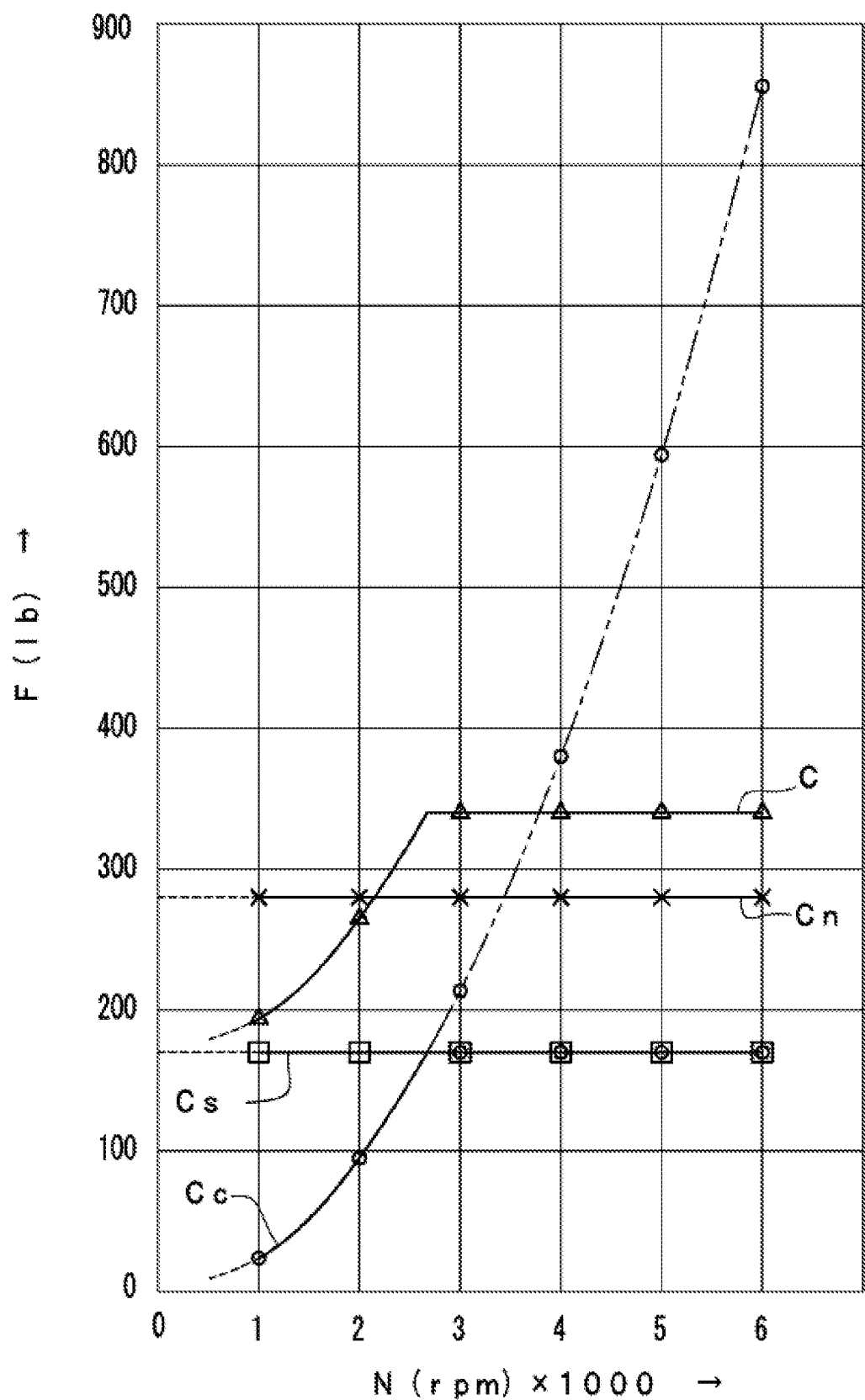
FIG. 10 Line drawing showing data associated with a working example of a friction clutch provided with a pressure plate device in accordance with the present invention.
Figure 11:
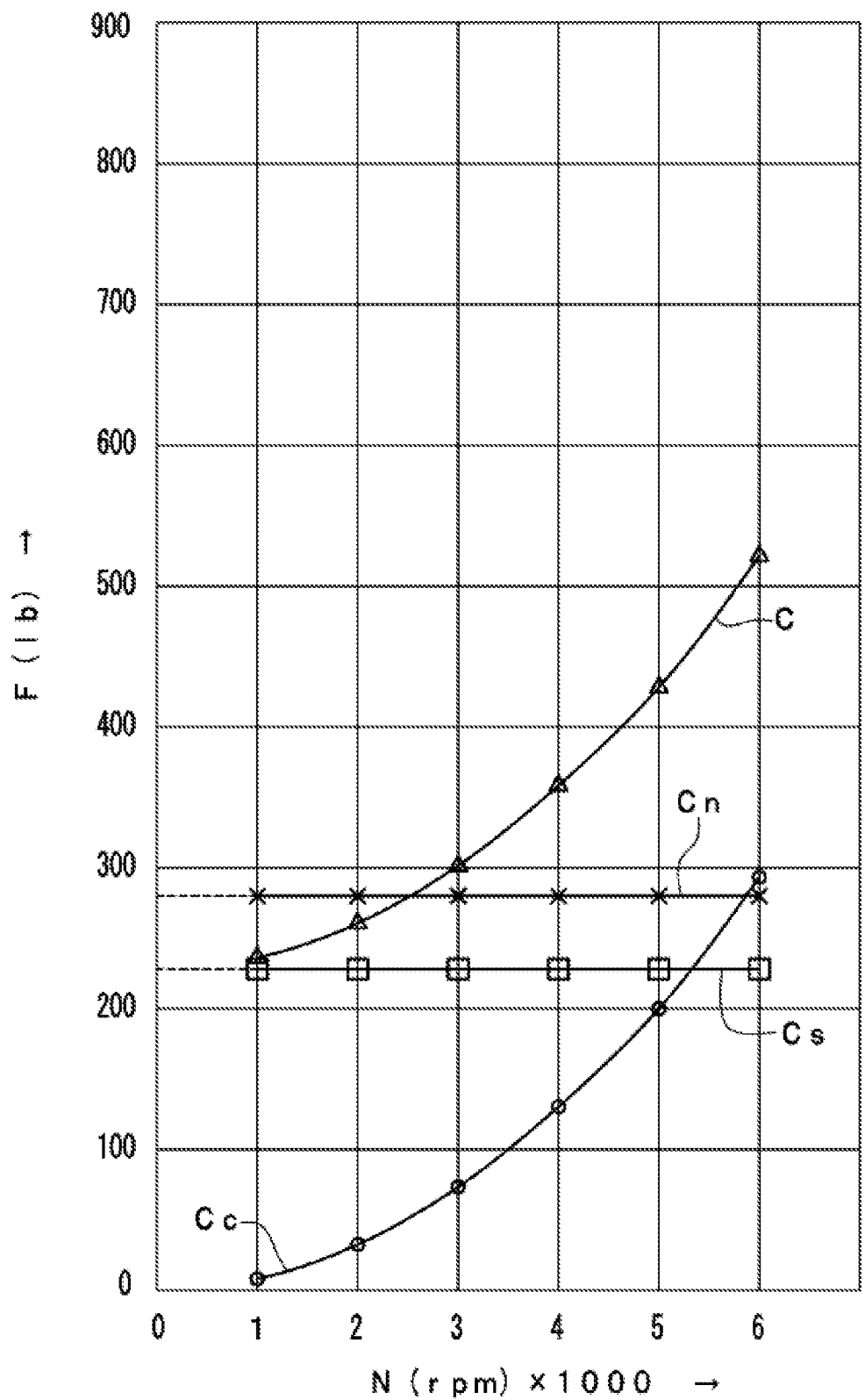
FIG. 11 Line drawing showing data pertaining to a friction clutch provided with a conventional retainer having a plurality V-shaped fingers.

A pressure-plate-type pressing unit 5 provided with a pressure plate device 11 associated with the aforementioned embodiment of the present invention was used to replace a retainer-type pressing unit provided with an existing retainer having a plurality of V-shaped fingers at a friction clutch in a 1580 cc motorcycle, and the actuatability of the clutch lever was compared. FIG. 10 is a line drawing showing the characteristics of pressing force F as a function of rotational speed N at the friction clutch following replacement of the pressing unit. FIG. 11 is a line drawing showing the characteristics of pressing force F as a function of rotational speed N at the friction clutch before replacement of the pressing unit. With respect to the changes apparent from comparison of FIG. 10 and FIG. 11, curve Cn indicates required load Fn, curve Cs indicates load Fs under initial conditions, curve Cc indicates centrifugal load Fc, and curve C indicates pressing force F. Whereas the required load Fn as set by the manufacturer of the motorcycle in this present working example was 280 pounds and the load Fs under initial conditions at the pressure plate device 11 was 170 pounds, the load Fs under initial conditions at the conventional retainer-type friction clutch having the plurality of V-shaped fingers was 220 pounds. Total weight of the centrifugal weights mounted on the V-shaped fingers of the retainer before replacement of the pressing unit was 166 g, and total weight of the weight plate 23 at the pressure plate device 11 following replacement of the pressing unit was 494 g. At FIG. 10, pressing force F is the sum of load Fs under initial conditions and centrifugal load Fc, required load Fn was reached at a rotational speed N of 2200 rpm, and movement of weight plate 23 was impeded and there was no longer increase in centrifugal load Fc at approximately 2800 rpm. Furthermore, because centrifugal force within the rotational speed domain in which rotational speed N was 2000 to 3000 rpm was low when the retainer-type pressing unit was employed, being such that the mass of the weights was approximately one-third of what it was when the pressure-plate-type pressing unit was employed, while high-power engines require spring devices having large spring constants, use of a friction clutch employing a pressure-plate-type pressing unit will make it possible to use a spring device having a small spring constant even when used with a high-power engine. A friction clutch provided with the pressure plate device 11 of this working example was able to definitively transmit motive force from a low-speed domain of the engine to a high-speed domain thereof, and made it possible to greatly reduce the squeezing force required for actuation of the clutch as compared with the conventional situation.

Figure 12:
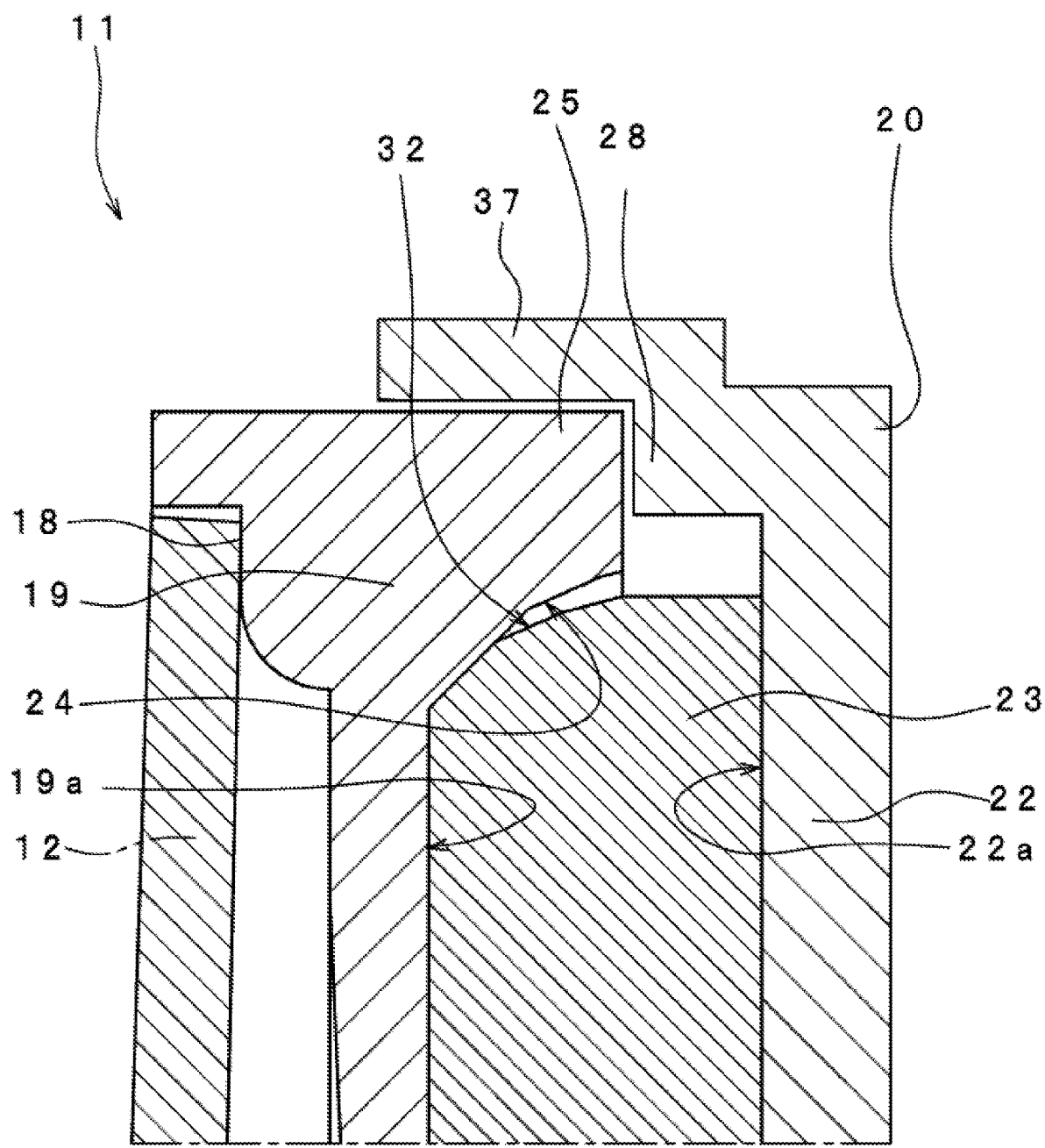
FIG. 12 Enlarged sectional view showing a region in the vicinity of the outside circumference of a pressure plate device associated with another embodiment of the present invention.
Figure 13:
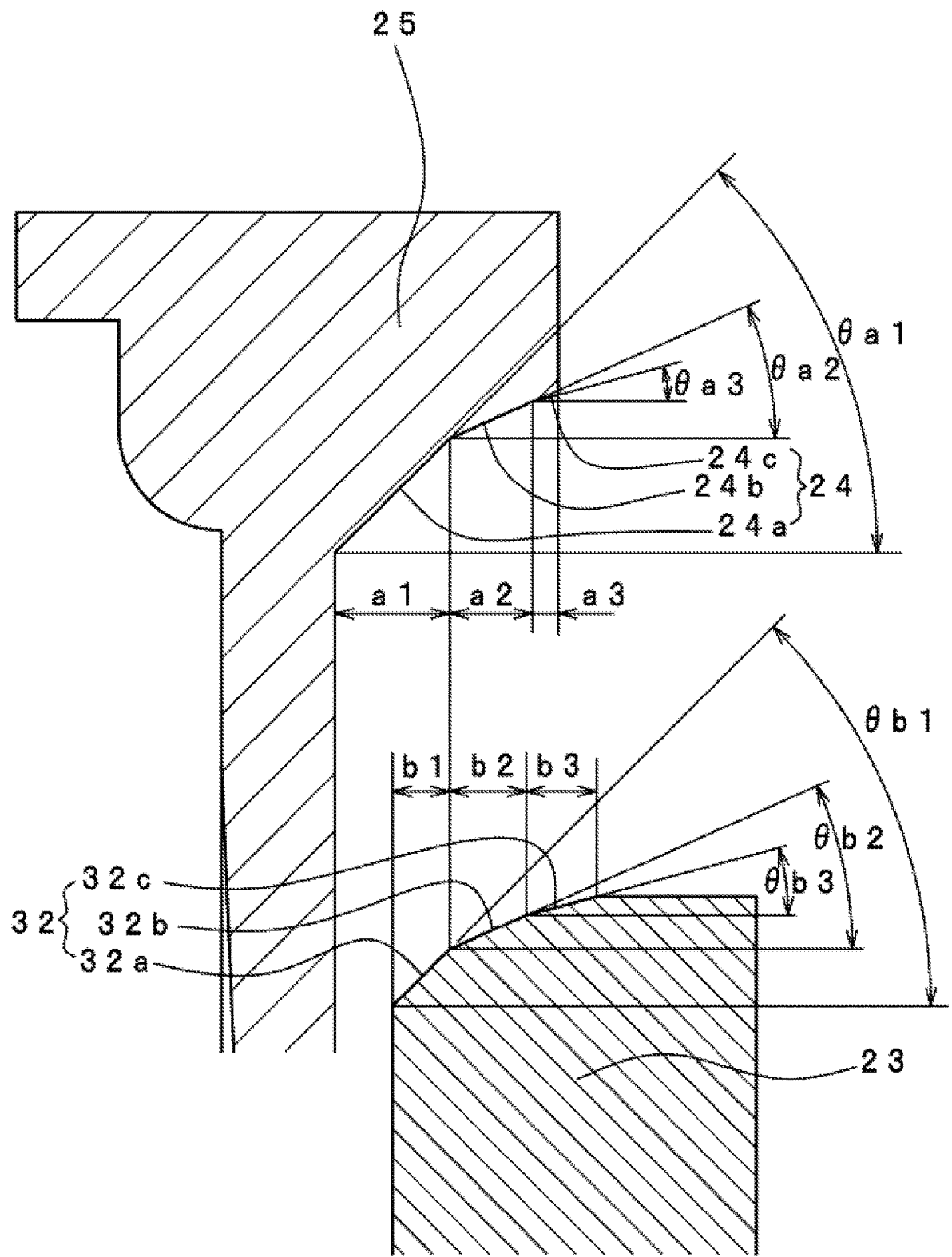
FIG. 13 Enlarged sectional view for explaining the relationship between a first wall face portion and a second wall face portion.

Other embodiments of the present invention will be described with reference to FIG. 12 and FIG. 13. FIG. 12 shows an enlarged view of a section taken along a plane containing axis X of primary pressure plate 19 in similar fashion as at the sectional view shown in FIG. 4. This embodiment differs from the foregoing embodiment with respect to the following points. To wit, inner wall face 24 possessed by first outer circumferential wall 25 is such that angles of inclination thereof with respect to a direction parallel to axis X mutually differ and comprise a plurality of wall face portions 24a, 24b, 24c which are disposed in linear arrangement in order of decreasing magnitude of angle of inclination as one proceeds from primary pressure plate 19 toward secondary pressure plate 22; tip portion inclined surface 32 of weight plate 23 comprises a plurality of inclined surface portions 32a, 32b, 32c corresponding to the plurality of wall face portions 24a, 24b, 24c; inclined surface portions 32a, 32b, 32c are such that angles of inclination θbi, θb2, θb3 thereof with respect to a direction parallel to axis X of primary pressure plate 19 are the same as angles of inclination θa1, θa2, θa3 of wall face portions 24a, 24b, 24c; and whereas width b3 of the inclined surface portion 32c which is nearest to secondary pressure plate 22 is greater than the width a3 of the wall face portion 24c corresponding thereto, widths b1, b2 of inclined surface portions 32a, 32b other than that inclined surface portion 32c are less than widths a1, a2 of corresponding wall face portions 24a, 24b. Angles of inclination θb1, θb2, θb3 with respect to a direction parallel to axis X of primary pressure plate 19 are 45°, 24°, and 15° at FIG. 3.

At FIG. 12, when weight plate 23 is acted upon by a centrifugal force and rises, the centrifugal load which is produced by the centrifugal force that acts on weight plate 23 successively decreases as primary pressure plate 19 and weight plate 23 sequentially come in contact with wall face portion 24a and inclined surface portion 32a, wall face portion 24b and inclined surface portion 32b, and wall face portion 24c and inclined surface portion 32c. Where necessary, angle of inclination θb3 of inclined surface portion 32c as well as angle of inclination θa3 of the wall face portion 24c which is nearest to secondary pressure plate 22 may be made less than the angles of friction. Where this is done, when inclined surface portion 32c of tip portion inclined surface 32 of weight plate 23 abuts wall face portion 24c of inner wall face of first outer circumferential wall 25 of primary pressure plate 19, movement of weight plate 23 and primary pressure plate 19 will be impeded.

Figure 14:
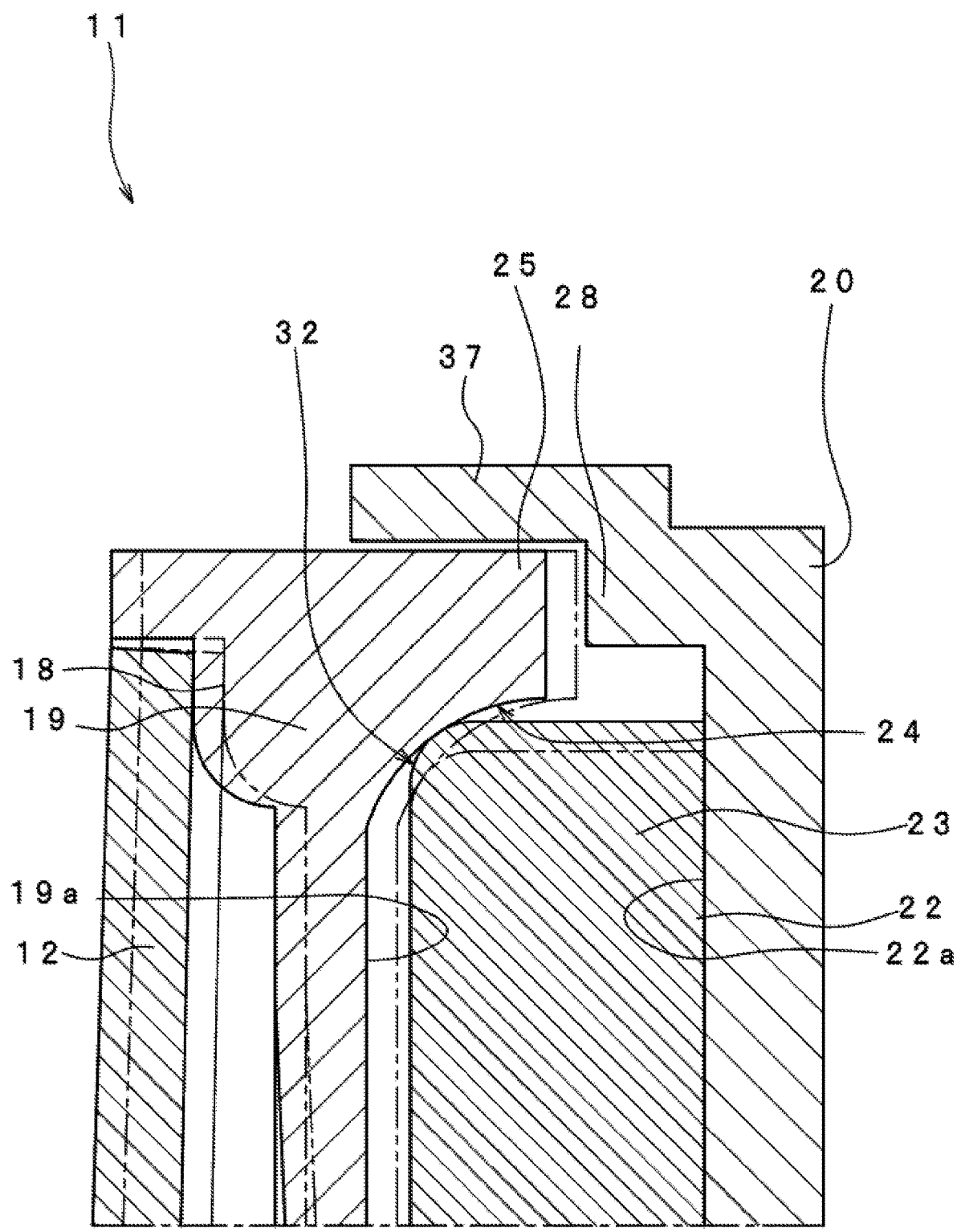
FIG. 14 Enlarged sectional view showing a region in the vicinity of the outside circumference of a pressure plate device associated with yet another embodiment of the present invention.

FIG. 14 shows yet another embodiment of the present invention, this embodiment differing from the embodiment shown in FIG. 8 in that inner wall face 24 possessed by first outer circumferential wall 25 is concavely curved, and in that tip portion inclined surface 32 of weight plate 23 is convexly curved such that the curvature thereof is greater than the curvature of the curve of inner wall face 24 possessed by first outer circumferential wall 25.

Figure 15:
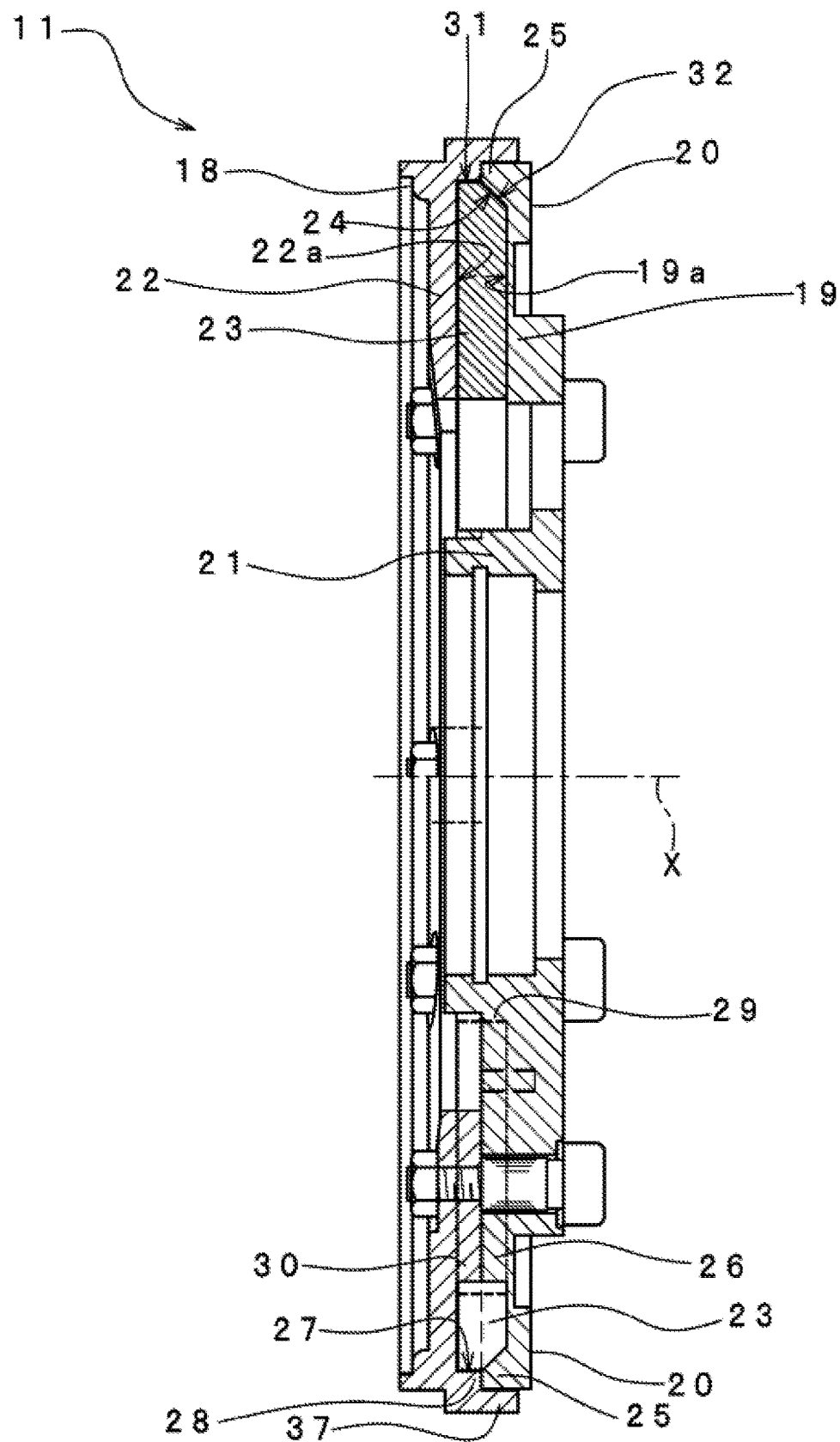
FIG. 15 Front view showing a variation on a pressure plate device in accordance with the present invention.

In accordance with the present embodiment, instead of primary pressure plate 19 having first engaging part 18 and secondary pressure plate 22 having second engaging part 20 and third engaging part 21 as at pressure plate device 11 shown in FIG. 4, a constitution may be adopted in which secondary pressure plate 22 has first engaging part 18 and primary pressure plate 19 has second engaging part 20 and third engaging part 21 as shown in FIG. 15. Furthermore, the pressure plate device of the present invention may be employed in a friction clutch even where the spring device provided therein is a spring device comprising one or more coil springs.

EXPLANATION OF REFERENCE NUMERALS

1 Friction clutch
2 Engine output sprocket
3 Transmission input shaft
4 Clutch disc unit
5 Pressing unit
6 Linkage release unit
7 Driven hub
8 Driven friction plate
9 Driving hub
10 Driving friction plate
11 Pressure plate device
12 Spring device (diaphragm spring)
13 Retainer
14 Linkage rod
15 Pushrod
16 Adjustment screw
17 Engaging body
18 First engaging part
19 Primary pressure plate
20 Second engaging part
21 Third engaging part
22 Secondary pressure plate
23 Weight plate
24 Inclined inner wall face
24a, 24b, 24c Wall face portion
25 First outer circumferential wall
26 First partition
27 Perpendicular inner wall face
28 Second outer circumferential wall
29 Inner circumferential wall
30 Second partition
31 Tip portion engaging surface
32 Tip portion inclined surface
32a, 32b, 32c Inclined surface portion
33 First space
34 Second space
35 Extension
36 Notch
37 Third outer circumferential wall
38 Headed guide pin
39 Hole
40 Counterbored surface
F Force pressing on clutch disc unit
Fc Centrifugal load
Fs Load under initial conditions
Fn Required load
Fm Maximum load
Fp Critical load Deflection of spring device
δw Distance moved by weight plate
δc Distance moved by primary pressure plate (centrifugal deflection)
δp Critical deflection
δs Initial deflection
δn Deflection under required load
δm Maximum deflection
a1, a2, a3 Width of wall face portion
b1, b2, b3 Width of inclined surface portion
θa1, θa2, θa3 Angle of inclination of wall face portion
θb1, θb2, θb3 Angle of inclination of inclined surface portion

The invention claimed is:

1. A friction clutch pressure plate device provided between a clutch disc unit of the friction clutch and a spring device that serves as a source of an elastic pressing force that is imparted to said clutch disc unit, the pressure plate device being characterized in that it comprises:
   an annular primary pressure plate that is arranged toward the spring device;
   an annular secondary pressure plate that is provided, concentrically with respect to an axis of the primary pressure plate and in such fashion as to permit movement in a direction of said axis, and that is arranged toward the clutch disc unit; and
   a plurality of weight plates that are capable of sliding in radial directions with respect to the axis and that are provided at regularly spaced rotational angles about the axis between mutually opposed side faces of the primary pressure plate and the secondary pressure plate;
   wherein the primary pressure plate comprises a first outer circumferential wall that is formed toward the weight plates of such primary pressure plate and that possesses an inner wall face which is inclined such that distance thereof from the axis increases with decreasing distance therefrom to the secondary pressure plate;
   wherein the secondary pressure plate comprises a second outer circumferential wall that is formed toward the weight plates of such secondary pressure plate and that possesses a perpendicular inner wall face; and
   wherein the weight plates comprise tip portion engaging surfaces that are capable of abutting the perpendicular inner wall face of the second outer circumferential wall, and tip portion inclined surfaces that are capable of abutting the inclined inner wall face of the first outer circumferential wall.

2. The friction clutch pressure plate device according to claim 1, the friction clutch pressure plate device being such that
   the primary pressure plate comprises a plurality of first partitions that are arranged at prescribed rotational angles about the axis;
   the secondary pressure plate comprises, between the second outer circumferential wall and the inner wall face, a plurality of second partitions that are arranged so as to oppose the plurality of first partitions; and
   the weight plates are such that shapes of such weight plates as viewed from fronts thereof are formed so as to be in shapes of fans having arcuate tips extending in parallel fashion with respect to the first outer circumferential wall and straight side edges extending in parallel fashion with respect to the first partitions as well as the second partitions, and the tip portion inclined surfaces are formed in shapes of conical surfaces.

3. The friction clutch pressure plate device according to claim 2, the friction clutch pressure plate device being such that
   the primary pressure plate has a first space between the first partitions and the first outer circumferential wall;
   the secondary pressure plate has a second space between the second partitions and the second outer circumferential wall; and
   the weight plates have extensions which enter the first space and the second space.

4. The friction clutch pressure plate device according to claim 3, the friction clutch pressure plate device being such that
   the weight plates have notches for allowing passage therethrough of linkage rods for linking the clutch disc unit and a retainer that is arranged on a side opposite the clutch disc unit from the spring device.

5. The friction clutch pressure plate device according to claim 3, the friction clutch pressure plate device being such that
   the weight plates have holes for allowing passage therethrough of linkage rods for linking the clutch disc unit and a retainer that is arranged on a side opposite the clutch disc unit from the spring device.

6. A friction clutch pressure plate device provided between a clutch disc unit of the friction clutch and a spring device that serves as a source of an elastic pressing force that is imparted to said clutch disc unit, the pressure plate device being characterized in that it comprises:
   an annular primary pressure plate that is arranged toward the clutch disc unit;
   an annular secondary pressure plate that is provided, concentrically with respect to an axis of the primary pressure plate and in such fashion as to permit movement in a direction of said axis, and that is arranged toward the spring device; and
   a plurality of weight plates that are capable of sliding in radial directions with respect to the axis and that are provided at regularly spaced rotational angles about the axis between mutually opposed side faces of the primary pressure plate and the secondary pressure plate;
   wherein the primary pressure plate comprises a first outer circumferential wall that is formed toward the weight plates of such primary pressure plate and that possesses an inner wall face which is inclined such that distance thereof from the axis increases with decreasing distance therefrom to the secondary pressure plate;
   wherein the secondary pressure plate comprises a second outer circumferential wall that is formed toward the weight plates of such secondary pressure plate and that possesses a perpendicular inner wall face; and
   wherein the weight plates comprise tip portion engaging surfaces that are capable of abutting the perpendicular inner wall face of the second outer circumferential wall, and tip portion inclined surfaces that are capable of abutting the inclined inner wall face of the first outer circumferential wall.

7. The friction clutch pressure plate device according to claim 6, the friction clutch pressure plate device being such that
   the primary pressure plate comprises a plurality of first partitions that are arranged at prescribed rotational angles about the axis;
   the secondary pressure plate comprises, between the second outer circumferential wall and the inner wall face, a plurality of second partitions that are arranged so as to oppose the plurality of first partitions; and the weight plates are such that shapes of such weight plates as viewed from fronts thereof are formed so as to be in shapes of fans having arcuate tips extending in parallel fashion with respect to the first outer circumferential wall and straight side edges extending in parallel fashion with respect to the first partitions as well as the second partitions, and the tip portion inclined surfaces are formed in shapes of conical surfaces.

8. The friction clutch pressure plate device according to claim 7, the friction clutch pressure plate device being such that
the primary pressure plate has a first space between the first partitions and the first outer circumferential wall;
the secondary pressure plate has a second space between the second partitions and the second outer circumferential wall; and
the weight plates have extensions which enter the first space and the second space.

9. The friction clutch pressure plate device according to claim 8, the friction clutch pressure plate device being such that
the weight plates have notches for allowing passage therethrough of linkage rods for linking the clutch disc unit and a retainer that is arranged on a side opposite the clutch disc unit from the spring device.

10. The friction clutch pressure plate device according to claim 8, the friction clutch pressure plate device being such that
the weight plates have holes for allowing passage therethrough of linkage rods for linking the clutch disc unit and a retainer that is arranged on a side opposite the clutch disc unit from the spring device.

11. A friction clutch pressure plate device provided between a clutch disc unit of the friction clutch and a spring device that serves as a source of an elastic pressing force that is imparted to said clutch disc unit, the pressure plate device being characterized in that it comprises:
an annular primary pressure plate that is arranged toward the spring device;
an annular secondary pressure plate that is provided, concentrically with respect to an axis of the primary pressure plate and in such fashion as to permit movement in a direction of said axis, and that is arranged toward the clutch disc unit; and
a plurality of weight plates that are capable of sliding in radial directions with respect to the axis and that are provided at regularly spaced rotational angles about the axis between mutually opposed side faces of the primary pressure plate and the secondary pressure plate;
wherein the primary pressure plate comprises a first outer circumferential wall that is formed toward the weight plates of such primary pressure plate and that possesses an inner wall face which is inclined such that distance thereof from the axis increases with decreasing distance therefrom to the secondary pressure plate;
wherein the secondary pressure plate comprises a second outer circumferential wall that is formed toward the weight plates of such secondary pressure plate;
wherein the weight plates comprise tip portion inclined surfaces that are capable of abutting the inclined inner wall face of the first outer circumferential wall;
wherein the inner wall face possessed by the first outer circumferential wall is such that angles of inclination thereof with respect to a direction parallel to the axis mutually differ and comprise a plurality of wall face portions that are disposed in order of decreasing magnitude of the angles of inclination as one proceeds from the primary pressure plate toward the secondary pressure plate;
wherein each of the tip portion inclined surfaces of the weight plates comprises a plurality of inclined surface portions that correspond to the plurality of wall face portions;
wherein the plurality of inclined surface portions are such that angles of inclination thereof with respect to the direction parallel to the axis are respectively identical to the angles of inclination of the corresponding wall face portions; and
widths of the plurality of inclined surface portions other than that inclined surface portion among the inclined surface portions which is nearest to the secondary pressure plate are less than widths of the corresponding wall face portions.

12. A friction clutch pressure plate device provided between a clutch disc unit of the friction clutch and a spring device that serves as a source of an elastic pressing force that is imparted to said clutch disc unit, the pressure plate device being characterized in that it comprises:
an annular primary pressure plate that is arranged toward the clutch disc unit;
an annular secondary pressure plate that is provided, concentrically with respect to an axis of the primary pressure plate and in such fashion as to permit movement in a direction of said axis, and that is arranged toward the spring device; and
a plurality of weight plates that are capable of sliding in radial directions with respect to the axis and that are provided at regularly spaced rotational angles about the axis between mutually opposed side faces of the primary pressure plate and the secondary pressure plate;
wherein the primary pressure plate comprises a first outer circumferential wall that is formed toward the weight plates of such primary pressure plate and that possesses an inner wall face which is inclined such that distance thereof from the axis increases with decreasing distance therefrom to the secondary pressure plate;
wherein the secondary pressure plate comprises a second outer circumferential wall that is formed toward the weight plates of such secondary pressure plate;
wherein the weight plates comprise tip portion inclined surfaces that are capable of abutting the inclined inner wall face of the first outer circumferential wall;
wherein the inner wall face possessed by the first outer circumferential wall is such that angles of inclination thereof with respect to a direction parallel to the axis mutually differ and comprise a plurality of wall face portions that are disposed in order of decreasing magnitude of the angles of inclination as one proceeds from the primary pressure plate toward the secondary pressure plate;
wherein each of the tip portion inclined surfaces of the weight plates comprises a plurality of inclined surface portions that correspond to the plurality of wall face portions;
wherein the plurality of inclined surface portions are such that angles of inclination thereof with respect to the direction parallel to the axis are respectively identical to the angles of inclination of the corresponding wall face portions; and
widths of the plurality of inclined surface portions other than that inclined surface portion among the inclined surface portions which is nearest to the secondary pressure plate are less than widths of the corresponding wall face portions.

13. A friction clutch pressure plate device provided between a clutch disc unit of the friction clutch and a spring device that serves as a source of an elastic pressing force that is imparted to said clutch disc unit, the pressure plate device being characterized in that it comprises:

an annular primary pressure plate that is arranged toward the clutch disc unit;

an annular secondary pressure plate that is provided, concentrically with respect to an axis of the primary pressure plate and in such fashion as to permit movement in a direction of said axis, and that is arranged toward the spring device; and a plurality of weight plates that are capable of sliding in radial directions with respect to the axis and that are provided at regularly spaced rotational angles about the axis between mutually opposed side faces of the primary pressure plate and the secondary pressure plate;

wherein the primary pressure plate comprises a first outer circumferential wall that is formed toward the weight plates of such primary pressure plate and that possesses an inner wall face which is inclined such that distance thereof from the axis increases with decreasing distance therefrom to the secondary pressure plate;

wherein the weight plates comprise tip portion inclined surfaces that are capable of abutting the inclined inner wall face of the first outer circumferential wall;

the inner wall face possessed by the first outer circumferential wall is concavely curved; and the tip portion inclined surfaces of the weight plates are convexly curved such that curvatures thereof are greater than the curvature of the curve of the inner wall face possessed by the first outer circumferential wall.

14. A friction clutch pressure plate device provided between a clutch disc unit of the friction clutch and a spring device that serves as a source of an elastic pressing force that is imparted to said clutch disc unit, the pressure plate device being characterized in that it comprises:

an annular primary pressure plate that is arranged toward the spring device;

an annular secondary pressure plate that is provided, concentrically with respect to an axis of the primary pressure plate and in such fashion as to permit movement in a direction of said axis, and that is arranged toward the clutch disc unit; and a plurality of weight plates that are capable of sliding in radial directions with respect to the axis and that are provided at regularly spaced rotational angles about the axis between mutually opposed side faces of the primary pressure plate and the secondary pressure plate;

wherein the primary pressure plate comprises a first outer circumferential wall that is formed toward the weight plates of such primary pressure plate and that possesses an inner wall face which is inclined such that distance thereof from the axis increases with decreasing distance therefrom to the secondary pressure plate;

wherein the weight plates comprise tip portion inclined surfaces that are capable of abutting the inclined inner wall face of the first outer circumferential wall;

the inner wall face possessed by the first outer circumferential wall is concavely curved; and the tip portion inclined surfaces of the weight plates are convexly curved such that curvatures thereof are greater than the curvature of the curve of the inner wall face possessed by the first outer circumferential wall.

15. The friction clutch pressure plate device according to claim 1, the friction clutch pressure plate device being such that such pressure plate device is arranged toward an exterior in the axial direction of said clutch disc unit from the clutch disc unit; and the spring device comprises a diaphragm spring and is arranged toward the exterior in the axial direction of the clutch disc unit from such pressure plate device.

16. The friction clutch pressure plate device according to claim 6, the friction clutch pressure plate device being such that such pressure plate device is arranged toward an exterior in the axial direction of said clutch disc unit from the clutch disc unit; and the spring device comprises a diaphragm spring and is arranged toward the exterior in the axial direction of the clutch disc unit from such pressure plate device.

17. The friction clutch pressure plate device according to claim 11, the friction clutch pressure plate device being such that such pressure plate device is arranged toward an exterior in the axial direction of said clutch disc unit from the clutch disc unit; and the spring device comprises a diaphragm spring and is arranged toward the exterior in the axial direction of the clutch disc unit from such pressure plate device.

18. The friction clutch pressure plate device according to claim 12, the friction clutch pressure plate device being such that such pressure plate device is arranged toward an exterior in the axial direction of said clutch disc unit from the clutch disc unit; and the spring device comprises a diaphragm spring and is arranged toward the exterior in the axial direction of the clutch disc unit from such pressure plate device.

19. The friction clutch pressure plate device according to claim 13, the friction clutch pressure plate device being such that such pressure plate device is arranged toward an exterior in the axial direction of said clutch disc unit from the clutch disc unit; and the spring device comprises a diaphragm spring and is arranged toward the exterior in the axial direction of the clutch disc unit from such pressure plate device.

20. The friction clutch pressure plate device according to claim 14, the friction clutch pressure plate device being such that such pressure plate device is arranged toward an exterior in the axial direction of said clutch disc unit from the clutch disc unit; and the spring device comprises a diaphragm spring and is arranged toward the exterior in the axial direction of the clutch disc unit from such pressure plate device.

* * * * *